US009434537B2

(12) United States Patent
McConnell et al.

(10) Patent No.: US 9,434,537 B2
(45) Date of Patent: Sep. 6, 2016

(54) SYSTEM AND APPARATUS FOR WASTE DISPOSAL AND CHANGING INFANT-TODDLER BEHAVIOR

(71) Applicant: Thomas E McConnell, Santa Ynez, CA (US)

(72) Inventors: Thomas E. McConnell, Santa Ynez, CA (US); Yafei Lu, Pizhou (CN)

(73) Assignee: Thomas E. McConnell, Santa Ynez, CA (US)

( * ) Notice: Subject to any disclaimer, the term of this patent is extended or adjusted under 35 U.S.C. 154(b) by 29 days.

(21) Appl. No.: 14/473,685

(22) Filed: Aug. 29, 2014

(65) Prior Publication Data

US 2016/0060027 A1 Mar. 3, 2016

(51) Int. Cl.

| | |
|---|---|
| ***G09B 19/00*** | (2006.01) |
| ***B65F 1/06*** | (2006.01) |
| ***B65F 1/14*** | (2006.01) |
| *B65F 1/00* | (2006.01) |
| *B65F 1/16* | (2006.01) |

(52) U.S. Cl.

CPC ................. *B65F 1/06* (2013.01); *B65F 1/163* (2013.01); *B65F 1/1607* (2013.01); *B65F 1/0006* (2013.01); *B65F 1/1623* (2013.01); *B65F 2001/1676* (2013.01); *B65F 2210/1675* (2013.01); *B65F 2220/128* (2013.01); *B65F 2240/132* (2013.01)

(58) Field of Classification Search

USPC ........ 434/236, 247; 446/236, 241, 243, 246, 446/257; 53/469, 567; 220/495.01, 495.06, 220/495.08

See application file for complete search history.

(56) References Cited

U.S. PATENT DOCUMENTS

| | | | | |
|---|---|---|---|---|
| 3,321,103 A | 5/1967 | Phillips | | |
| 4,618,330 A * | 10/1986 | Abe | A63H 1/06 | 446/236 |
| 4,643,692 A * | 2/1987 | Magers | A63H 1/20 | 446/236 |
| 5,125,526 A * | 6/1992 | Sumanis | B65F 1/06 | 220/263 |
| 5,238,440 A * | 8/1993 | Morin | A63H 1/06 | 273/142 E |
| 5,314,338 A * | 5/1994 | Caveza | G09B 19/00 | 434/259 |
| 5,799,909 A * | 9/1998 | Ziegler | B65F 1/1415 | 220/481 |
| 6,719,194 B2 * | 4/2004 | Richards | B65F 1/062 | 220/263 |
| 6,851,251 B2 * | 2/2005 | Stravitz | B09B 3/0025 | 53/370 |
| 7,503,152 B2 * | 3/2009 | Stravitz | B65B 9/15 | 53/211 |
| 7,594,376 B2 * | 9/2009 | Chomik | B65B 7/12 | 53/370 |
| 7,660,724 B2 * | 2/2010 | Mallett | A61B 19/0248 | 206/366 |
| 7,696,711 B2 * | 4/2010 | Pollack | B65F 1/06 | 318/466 |
| 7,712,285 B2 * | 5/2010 | Stravitz | B65F 1/12 | 200/61.62 |
| 7,958,704 B2 * | 6/2011 | Stravitz | B65B 9/15 | 206/303 |
| 8,127,519 B2 * | 3/2012 | Stravitz | B65F 1/0006 | 53/469 |
| 8,266,870 B1 | 9/2012 | Stravitz | | |
| 8,567,157 B2 * | 10/2013 | Dunn | B65F 1/0006 | 220/495.06 |
| 8,833,592 B2 * | 9/2014 | Dunn | B65F 1/0006 | 220/495.06 |
| 8,844,751 B2 * | 9/2014 | Sakaguchi | B65F 1/06 | 220/253 |
| 2002/0038535 A1 * | 4/2002 | Jensen | B65B 9/15 | 53/459 |
| 2006/0237461 A1 * | 10/2006 | Chomik | B65B 7/12 | 220/495.06 |
| 2008/0019618 A1 | 1/2008 | Dayton et al. | | |

* cited by examiner

*Primary Examiner* — Kurt Fernstrom

(74) *Attorney, Agent, or Firm* — WPAT, P.C., Intellectual Property Attorneys; Anthony King

(57) ABSTRACT

A diaper pail having a top chamber with top transparent doors, and a transparent outer casing, allowing a user to see the rotating inner barrel as it spins within the transparent outer casing. The inner barrel holds a disposable bag and as it rotates the inner barrel untwists a neck of bag, thus opens the bag for a dirty diaper to fall into the bag from the top chamber. The dirty diaper falls into the bag while the doors of the top chamber remain shut, keeping malodorous gas from escaping. The visual spectacles provided by this diaper pail also act to change infant and toddler behavior by associating diaper change to a fun and fascinating event.

20 Claims, 22 Drawing Sheets

SYSTEM AND APPARATUS FOR WASTE DISPOSAL AND CHANGING INFANT-TODDLER BEHAVIOR

CROSS-REFERENCE TO RELATED APPLICATIONS

This application claims priority to, and is a continuation of, U.S. Patent Application concurrently filed on the same day, entitled Disposable Bag and the Method of Using the Same, now pending, which is hereby incorporated by reference in its entirety.

BACKGROUND OF THE INVENTION (1) Field of the Invention

The field of the invention relates to disposal systems of malodorous waste packages, namely dirty diapers, while also positively reinforcing infant-toddler behavior and child development.

(2) Description of Related Art Including Information Disclosed Under 37 CFR 1.97 and 1.98

Dirty diapers and/or other waste items can generate unpleasant odors, especially over extended time periods. Consequently, placing such waste items in a waste container that does not provide adequate sealing can result in the undesirable result of having odors escape into the surrounding environment.

At present, there are numerous diaper disposal pails on the market; however, none are entirely satisfactory. Presently, diaper pails on the market simply have tops that cover a container housing the dirty diapers, yet such tops are not hands-free, requiring a user to grasp a handle, a latch, or the like to open the container in order to dispose of the diaper. Accordingly, such diaper pails serve as adequate disposal containers, yet are still unable to contain or mask the stench of dirty diapers because upon opening the diaper pail top, the stench will almost certainly be let out of the container. Some diaper pails have add-on products such as carbon filters and baking soda cartridges to absorb or neutralize odors, which may not be completely effective given that the bags within the diaper pails are not sealed off to prevent odors from escaping once the top of the diaper pail is open.

Other diaper pails such as U.S. Pat. No. 8,127,519, which is incorporated herein by reference, have flexible material separating the main body cavity of the pail from an upper portion of the pail. However, such diaper pails still do not afford hands-free disposal and require the user to forcefully push the diaper by hand through the flexible webbing into the main body cavity of the pail. Even more, although there may be a twisting mechanism in efforts to contort and seal off a neck of the bag, the flexibility of the material does not create a tight seal thereby leaving gaps allowing odors to escape through the bag opening.

Another receptacle such as that illustrated in U.S. Pat. No. 5,125,526, which is incorporated herein by reference, discloses a receptacle with a rotatably mounted holder. In response to movement of a foot pedal, the holder rotates opening and closing the bag. While an upper portion of the bag is fixed to the receptacle, a lower portion of the bag is adhered to the holder using a double-sided adhesive tape so that the bag rotates with the holder. However, this receptacle has its disadvantages; in particular, the bag maintains its twisted formation only when the top is closed. Upon pressing down the foot pedal, the top opens, the holder rotates, and the bag opens causing the unpleasant odors to flow out of the open bag. Since the bag is only twisted closed when top of the receptacle is closed; once the top is opened, the bag will also open and thus emit undesirable odors. Furthermore, the double-sided adhesive tape which adheres the bag to the holder, typically incurs additional drawbacks. One of ordinary skill in the art would recognize that the double-sided adhesive tape must be of sufficient strength to adhere to the holder such that the point of adherence to the holder will not peel off when the holder rotates; however, due in part to the force of the rotation of the holder, the double-sided adhesive tape on the conventional plastic bag may end up distorting and stretching the plastic, and creating holes in the bag, particularly around where the tape is adhered.

Accordingly, there is a continuing need for an improved diaper pail or waste container having a hands-free or touch-free means for enhanced confinement of malodorous waste objects deposited into a container thereby retaining and preventing offensive odors from being emitted from the waste container. In other words, the waste disposal system would feature a means of depositing waste into a container while maintaining the bag in a closed formation for at least the duration of time that the top is open so that the user would not have to risk inhaling undesirable odors and other particles.

Additionally, existing diaper disposal pails typically serve as an object for which users, typically adults, only use to dispose of the diapers. Typically, a waste receptacle does not serve as a decorative or visually stimulating article in the room. In other words, the waste receptacle is typically not an article of interest or stimulation for infants and toddlers. A visually stimulating diaper pail could serve to reinforce infant-toddler behavior and enable infants and toddlers to alert parents for diaper-change as they would be excited to view the visually stimulating event that accompanies diaper disposal. It can be further appreciated that a desirable waste disposal system also further serves as a visually stimulating system that also positively reinforces infant-toddler behavior and assists in child development.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

Improved embodiments of a diaper pail or waste disposal system which serves as a system for positive reinforcement of infant-toddler behavior and child development are hereby disclosed. The general concept is to provide a diaper pail or waste receptacle that comprises a feature such that a user may dispose of malodorous waste without the risk of inhaling unpleasant odors.

In some embodiments the waste disposal system features a top having at least one door such that when a waste material is dropped or tossed through the door of the top, the disposable bag within the receptacle maintains a closed formation; after the door is closed, upon user actuation, the disposable bag will temporarily open for the dirty diaper to drop into the bag's main cavity, and then the bag will return to its closed formation. Accordingly, the movement of the door of the top is independent of a change in the open or closed formation of the disposable bag.

In further contemplated embodiments, waste disposal system features at least one attachment mechanism within an inner barrel of the waste receptacle. The attachment mechanism is a hook, a peg, or a clip to which a disposable bag has a receiver to make a detachable coupling with the attachment mechanism. In some embodiments, the receiver of the disposable bag is at least one of a hole, a sleeve, or a reinforced tab.

Among the many different possibilities contemplated, a preferred embodiment of a closed formation of the disposable bag is wherein a neck of the bag is twisted. In the alternative, the neck of the bag is rolled. In yet another embodiment, the neck of the bag is clamped. For example, the closed formation can be produced via movement of a lower body of the bag relative to the upper portion i.e., a neck of the bag. One of ordinary skill in the art would immediately recognize that there are many other known mechanisms for the purpose of situating a disposable bag in a closed formation. Further, in a preferred embodiment, the user actuated mechanism that temporarily opens the bag is via a foot pedal. In the alternative, the user actuated mechanism is a motion sensor. In yet another embodiment, the mechanism is via a button or a handle. In another alternative embodiment, the user actuated mechanism is a weight sensor.

The contemplated systems are particularly useful for use in nurseries, daycare centers, and other places that handle particularly malodorous waste such as dirty diapers. Using this hands-free and touch-free system, a user can now dispose of malodorous diapers and waste products without the risk of inhaling unpleasant odors.

Another aspect of the invention is directed to a visually stimulating waste disposal system directed to positively reinforcing infant-toddler behavior. It is commonly known that the right visual stimulation helps with a child's brain development. In a preferred embodiment, the waste receptacle features a transparent outer barrel casing and an inner barrel with a bright, colorful exterior. Further contemplated exteriors feature stop-motion animation so that upon user actuation, the receptacle features animated movements to further entice the attention of infants and toddlers. It is still further contemplated that the different exteriors of the inner barrel can be interchangeable for continued stimulation during a child's growth and development. Further, the enticing exteriors and the subsequent animation of the moving inner barrel can attract and positively train children to alert parents for diaper changing. Concurrently, the bright colors, designs, and visually stimulating images can further help stimulate a child's vision and brain development.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Figure 1A:
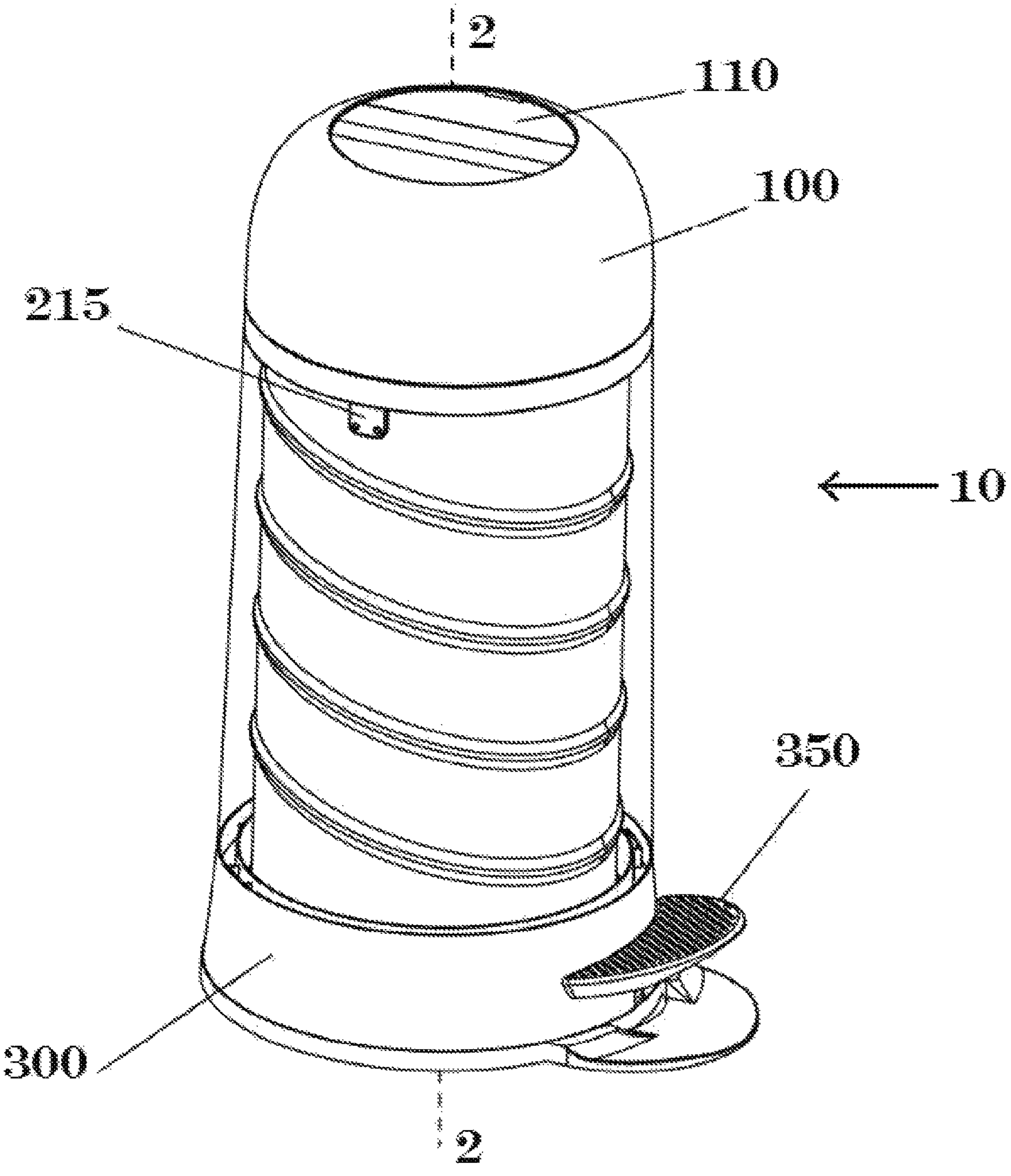
FIG. 1A is a perspective view of a first embodiment of a diaper pail having a transparent outer barrel.

FIG. 1A generally depicts a preferred embodiment of a diaper pail or container assembly 10. In FIG. 1A, the container assembly 10 is shown having a base 300 with a pedal 350 protruding out of the base 300. Coupled to the base 300 is an inner barrel 210 having an inner volume and an outer barrel casing 200 enclosing/encasing the outer circumference of the inner barrel 210. Preferably there is sufficient clearance between the inner barrel and the outer barrel, so that the inner barrel can freely rotate without touching the outer barrel. The inner barrel 210 shown has some kind of spiral blade on its outside surface, this spiral blade does not aid in driving or rotating the inner barrel 210. This spiral blade does not interact or engage with the outer barrel 200. The illustrated spiral blade is one of the contemplated designs on the inner barrel 210 to create visual stimulation. In the depicted embodiment, the outer barrel casing 210 is transparent, and the inner barrel casing 210 can be seen through the transparent outer barrel casing 200, as the inner barrel casing 210 rotates. Other contemplated embodiments may feature designs on the outer barrel casing 200. Yet other contemplated embodiments feature a partly opaque outer barrel casing 200. Yet another contemplated embodiment features a completely opaque outer barrel casing 200. In the upper region of the container assembly 10 is a top 100 having two pivoting doors 110. In other embodiments, the top has at least one pivoting door. In less preferred embodiments, the top does not have a pivoting door. In the depicted embodiment, the inner barrel 210 has at least one attachment mechanism 215 on the inner barrel.

Although the word barrel usually describes a tubular object having a circular cross-sectional shape, it is specifically noted here that the word barrel in the specification has no specific limitation or restriction on its cross-sectional shape.

Figure 1B:
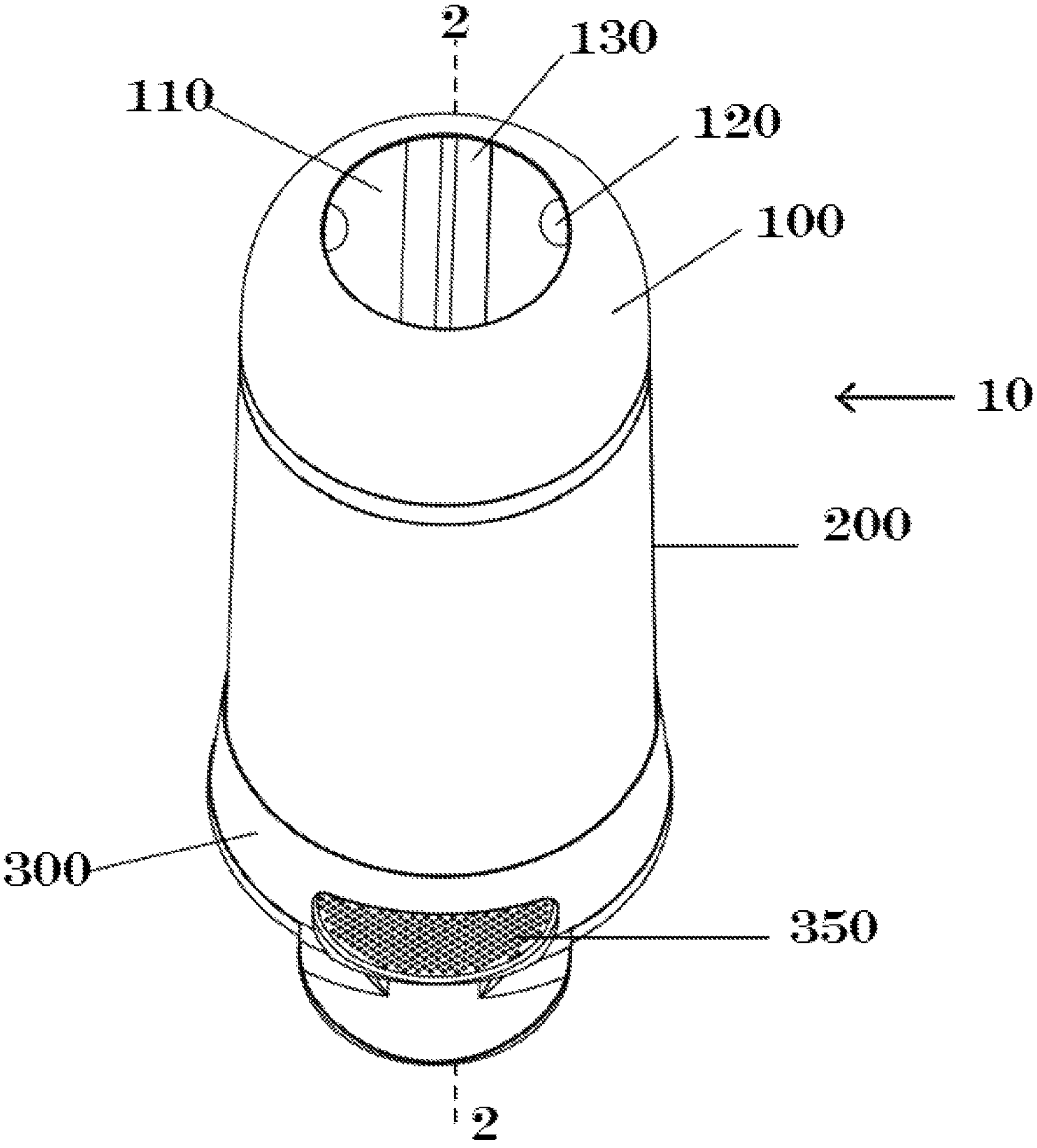
FIG. 1B is a top angled perspective view of the diaper pail of FIG. 1A (the outer barrel is not shown to be transparent, for easier illustration).

FIG. 1B shows another view of the diaper pail or container assembly 10 looking downwards through the two pivoting transparent door panels 110 (closed as shown) into the inner space of the container assembly 10. The door panels 110 are coupled to the top 100 with a resilient piece 120. The resilient piece 120 is sufficiently strong to bias the door panels 110 shut, yet allows for the door panels 110 to swing open in a downward direction when a dirty diaper falls onto the door panels 110, thereby allowing the dirty diaper to fall through the door panels 110. After the waste is passed through the door panels 110, the door panels 110 swing shut. In contemplated embodiments, the resilient piece 120 is made of silicone. In other embodiments, the resilient piece is 120 made of a resilient material such as rubber. In further contemplated embodiments, the resilient piece 120 is a leave spring or coil spring.

The shown embodiment further shows a seal 130 between the two door panels 110. In keeping with its designated term, the seal 130 serves to seal the two door panels 110 when they overlap, to retain and prevent odors from seeping out. In contemplated embodiments, the seal 130 is a long flexible strap made of a material such as rubber, silicone, and the like . . . to attach to one, or both door panels 110 at their far ends away from the resilient piece 120. The purpose of the seal 130 is to form a secure temporary substantial airtight closure when the two doors 110 close on each other. This way, the flexible seal 130 of one door panel overlaps with the flexible seal 130 of other door panel, making a tight seal. In an embodiment where each door 110 has a seal 130, the two flexible seal 130 would overlaps each other when the doors 110 are closed, making a tight seal. In less preferred embodiments, the door panels 110 do not have a seal 130.

The term door or door panel refers to generally known means for a user to divide and separate space. Contemplated door or door panels are selectively operated by a user. Doors or door panels are not limited to those that pivot on a hinge. The door or door panels can come in various forms, such as those shown and discussed above. In other alternative embodiments, a door or doors can be shutter blades similar to those seen in cameras. Shutter blades can be operated and driven mechanically or electronically. No matter which form of door or doors is implemented, the door or doors can be operated manually (e.g., via a button or lever), or operated/controlled electronically via sensors (e.g., weight sensor, motion sensor, light sensor). In some embodiments, the door or doors are driven by a motor. In further embodiments, the door or doors are controlled by a remote controller via wire or wirelessly.

Figure 2:
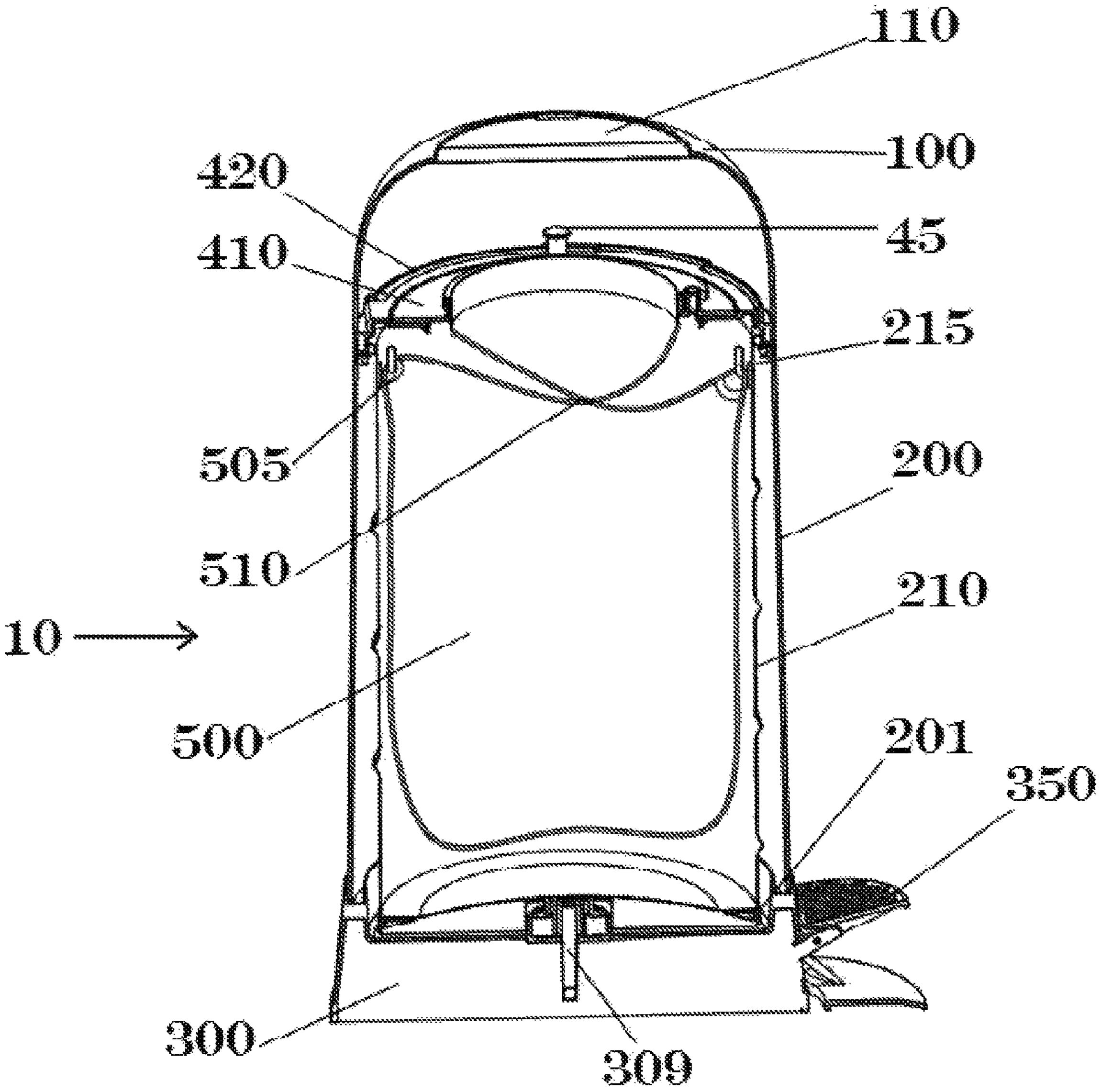
FIG. 2 is a vertical cross-sectional view taken along line 2-2 of FIGS. 1A and 1B.

FIG. 2 depicts cross-sectional view of the container assembly 10 taken along line 2-2 of FIG. 1A. A disposable bag 500 is mounted within the container assembly 10. In the depicted embodiment, a neck 510 of the disposable bag 500 is twisted in a closed formation. The base 300 has a rotatable axle 309 on which a barrel base 201 of the inner barrel 210 is coupled to. When the foot pedal 350 is at rest, the neck 510 of the disposable bag 500 is in a twisted-closed formation. When the foot pedal 350 is compressed, the inner barrel 210 rotates in a first direction untwisting the neck 510 of the disposable bag 500 to an open formation. When the foot pedal 350 is released, the inner barrel 210 rotates in a second direction returning the disposable bag 500 to the closed formation.

It should be noted that U.S. Pat. No. 5,125,526 teaches a garbage can where the top lid opens simultaneously with the untwisting of its bag. In other words, their actions are synchronized, and for desirous reasons. The inventors of the current application, however, surprisingly discovered the advantages of having such top lid (door 110) moving independently of an untwisting of the bag 500. Accordingly, in preferred embodiments, the actuated change in open or closed formation of the disposable bag 500 is independent of the movement of the top transparent doors 110. That is, when waste such as a dirty diaper is dropped through the door 110, the user-actuated change into open formation of the disposable bag 500 does not occur simultaneously. The top doors 110 facilitate touch-free passage of a dirty diaper through the top 100 so a user may simply drop the dirty diaper on top of the doors 110 without physically touching any part of the waste disposal system. The dirty diaper is to pass through the top door 110 and rest atop the twisted-closed neck 510 of the disposable bag 500. This advantageously allows a user to keep the dirty diaper in the sealed top chamber, and then compress the pedal 350 to untwist and open the bag 500, thereby keeping malodorous gas within the diaper pail when the dirty diaper drops into the cavity of the bag 500. This way, when a user deposits the dirty diaper, malodorous gas from within the inner cavity of the bag 500 does not immediately escape through the top transparent door 110 and into his/her face. Once the pedal 350 is released, the bag 500 twists closed thereby retaining undesirable odors inside.

In the embodiments shown in the drawings, a foot pedal 350 is shown. A foot pedal 350 is only one type of contemplated actuators. The preferred embodiments may use other types of actuators, such as a motion sensor, a weight sensor, a button, or a handle. The purpose of the actuator is for a user to pass on command (either electronically or mechanically) to the base, which contains corresponding mechanism (gears, electronic motor, rotating axle, etc.) to rotate the inner barrel 210. In the case of a motion sensor, a user would simply wave his/her hand or foot in front of the motion sensor to activate it, which in turn activates an electric motor in the base 300, causing the motor to rotate the inner barrel 210. Alternatively, the motion sensor can be installed inside of the top chamber to detect whenever the top doors 110 move, or whenever a dirty diaper enters into the top chamber. In one embodiment, the diaper pail allows a few seconds of delay before an electric motor in the base 300 is activated to turn the inner barrel 210. These few seconds of delay allow the top transparent doors 210 to completely close, before untwisting of the bag 500. In the case of a weight sensor, the weight sensor maybe installed at a place that would detect a dirty diaper entering into the top chamber and dropping onto the twisted-closed neck of bag 500. Likewise, the weight sensor activates an electric motor in the base 300 to rotate the inner barrel 210. In a preferred embodiment, there is provided a few seconds of delay, allowing the transparent top doors 110 to close before untwisting the bag 500.

Furthermore, in preferred embodiments, there is at least 5 cm of clearance height between the top surface of the door 110 and an upper rim of the disposable bag 500 when the door 110 is closed. This allows for sufficient space for the waste material to pass through the top doors 110 and for the top door 110 to swing shut thereafter, while the waste material remains in the top chamber. Alternatively, the clearance height is at least 6 cm. In yet another embodiment, the contemplated clearance height is at least 7 cm; and other embodiments have a clearance height of 10 cm and above.

One purpose of the clearance height is to essentially create a closed chamber where a dirty diaper may stay temporarily, before it is disposed into the inner cavity of bag 500. Preferred chamber can be partially transparent, such as having transparent walls or doors 110, so a user may see whether or not the dirty diaper has successfully dropped in to the bag 500. As described earlier, one of the advantages this chamber provides is to be a temporary staging area for a dirty diaper, so that when a user opens the bag 500, the door 110 is already shut behind it, keeping malodorous gas contained entirely within the container assembly 10.

While the word chamber is used in the claims and throughout this specification, a chamber is not limited to a space confined by structural walls and narrow ingress and egress. The contemplated top chamber can be merely a clearance space between the topmost portion of the container assembly and a closed entrance of the disposable bag 500. In the illustrated examples, the closed entrance is where the neck of the bag 500 twists shut. In other contemplated examples, the disposable bag 500 does not twist, instead, the closed entrance is where the neck of the bag 500 is mechanically folded shut, or clamped shut. In more mechanically or electrically complicated embodiments, the bag 500 does not twist, and there is no rotating inner barrel, the closed entrance to the bag is another door or set of doors that open and close independent of the top door 110. In such embodiments, a waste material enters through top door 110, and remains in the chamber region before the second set of doors open to let the waste material fall into the bag 500. In further embodiments, the bag simply hangs in the container, with a clearance space between a top door and a second door, where the two doors are independently operated/controlled. In embodiments where a twisting of the bag in not necessary, one may use a bucket (enclosed within the container assembly) or other type of enclosure, instead of a bag, to catch/hold waste material.

One of the main purposes of the inventive subject matter is to have a waste container to hold waste materials (e.g., dirty diapers) inside, and provide two separately operated/controlled sets of doors. And the waste material is allowed to stay in a staging area between the two doors, before allowing the waste material to drop further into the container (which may have a bag, or a bucket, any enclosure, or nothing to catch the waste). One of ordinary skill in the art would immediately recognize a number of different mechanical/electrical/electro-magnetic ways to accomplish this agenda.

It should be noted that, conventionally it is considered unsightly to have a trash can with a transparent door, transparent top, or a transparent body. Conventional wisdom dictates that such transparent structure is undesirable because the idea of having a trash can is to place waste objects out of sight. As demonstrated in the many embodiments disclosed herein, the inventors have surprisingly discovered novel methods and advantages by making various parts of a waste container assembly 10 transparent.

Figure 6A:
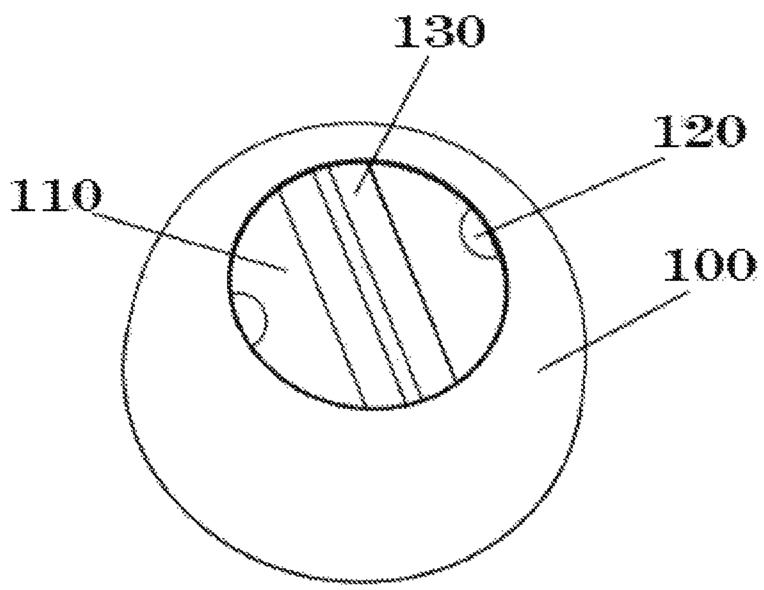
FIG. 6A is a perspective view of the top having two door panels.
Figure 6B:
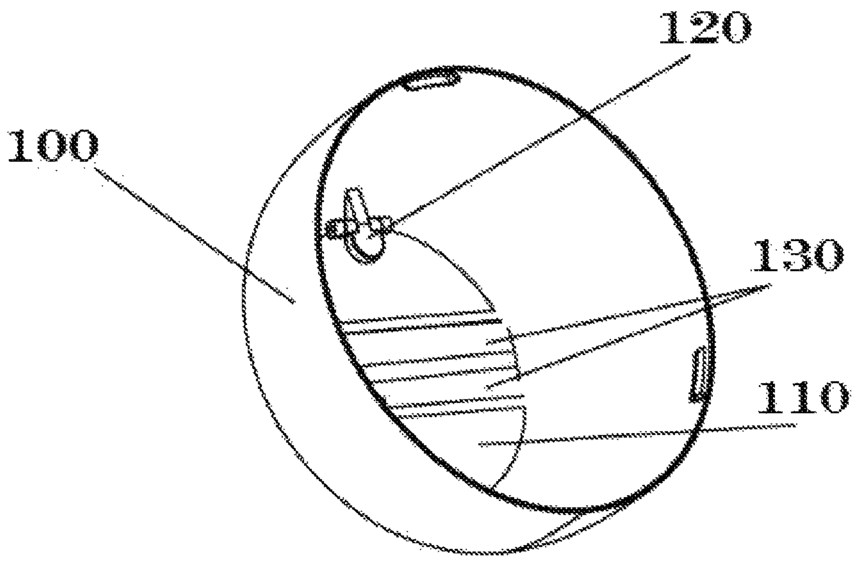
FIG. 6B is a perspective view of the inside of the top of FIG. 6A, while the top is turned upside down.

Another advantage of having transparent top doors 110 is to give a user the ability to visually inspect the fullness of the bag 500 without risking malodorous gas escaping. Because doors 110 are transparent, the user may simply compress the food pedal 350 and look down into the bag 500, while the top transparent doors 110 remain shut, keeping malodorous gas in. All of this can be done without risking escaping malodorous gas, because the top chamber essentially acts as the barrier. FIGS. 6A and 6B show the top 100 of the diaper pail. The top 100 is in a form of a lid, and its interior space is essentially the top chamber.

While top 100 is shown in the form of a detachable lid, many other contemplated configurations are possible. For example, the top 100 can be made as an integral part of outer barrel, and the disposable bag 500 can be inserted/removed through a much larger top door 110. In another less preferred embodiment, the disposable bag 500 can be inserted/removed through a side door (through both the inner barrel and the outer barrel).

Referring now to FIG. 2 with respect to bag attachment mechanisms, FIG. 2 features at least one bag attachment mechanism 215 in the inner barrel 210. In preferred embodiments, there are two bag attachment mechanisms 215 located directly opposite one another on the inside of the inner barrel 210. In some embodiments, the disposable bag 500 has at least one receiver 505 to make detachable coupling to the at least one bag attachment mechanism 215. In the depicted embodiment, the disposable bag 500 is detachably coupled to the inner barrel 210 at the attachment mechanisms 215, while the top rim of the bag 500 is coupled to parts of the outer barrel casing 200. In contemplated embodiments the receiver 505 is one of a hole, a sleeve, a reinforced hole, and a reinforced tab. In FIG. 2, the two receivers on the bag 500 are reinforced holes, and the bag attachment mechanism 215 on the inner barrel 210 is two hooks. By detachably attaching the receiver 505 of the disposable bag 500 to the inner barrel 210, the bag 500 can rotate with the inner barrel 210 (while the top rim of the bag remains stationary) in one direction to an open formation, then rotate the bag 500 in another direction to closed formation (while the top rim of the bag remains stationary). In the embodiments of FIG. 2, this is done by compressing and releasing the foot pedal 350. Other contemplated attachment mechanisms 215 include a peg, or a clip. Also contemplated is where the inner barrel 210 uses mechanical structures such as clips, folds, tentacles, protuberance, or any surface material (even flat rubbery surface) to cause friction with the disposable bag 500 to grasp the bag 500, and the bag 500 is not required to have corresponding structure. This way, a user may use any typical garbage bag in the inner barrel 210, and the contemplated inner barrel can still twist the body of the bag 500 in relation to the top rim of the bag 500.

Further depicted in FIG. 2 is another bag attachment mechanism, the purpose of which is to couple the top rim of the bag 500 to the outer barrel casing 200. This way, when the body of bag 500 rotates along with inner barrel 210, the top rim of the bag 500 can remain stationary along with the outer barrel casing 200. As shown in FIG. 2, this top rim attachment mechanism can be a frame assembly 400 disposed on top of the inner barrel 210. Most preferably, the frame assembly 400 is disposed above the inner barrel 210, but does not have physical contact with the inner barrel 210. A top rim (open edge) of the bag 500 is removably mounted onto the inner circumference of the frame assembly 400. The frame assembly 400 is comprised of a roller base 420 and a bag roller 410. The bag roller 410 is configured to rotate or spin by hand, relative to the roller base 420. In the pictured embodiment, a user may pull out and hold protruding peg 45, and then manually move the protruding peg 45 in a rotating direction to move the bag roller 410. Releasing peg 45 locks the peg 45 in position when needed, especially after the top rim of the bag is rotated, thereby twisting its neck. Less preferred embodiments do not feature the peg 45. The purpose of the peg 45 and the bag roller 410 is for a user to "preload" the disposable bag 500 into a twisted-closed formation. In operation, to install a bag 500 a user would first remove or tilt open the top 100 and the frame assembly 400 from the container assembly 10. Now that the inner barrel 210 is exposed, the user would place bag 500 into the inner barrel 210, and attach body of the bag 500 to bag attachment mechanism 215 on the inner barrel 210. After the bag is secured to the inner barrel 210, the user would next install the frame assembly 400 onto the container assembly 10 (while the bag is entirely within the inner barrel 210). The user would next reach his/her hand through the center opening of the frame assembly 400, and pull the top rim of the bag 500 through the center opening of the frame assembly 400. The idea is to next fasten the top rim of the bag 500 to the frame assembly by necessary means, and then manually "preload" the disposable bag 500 by twisting close its neck.

Still further contemplated embodiments feature a ridge on the bag roller 410 to spin relative to the roller base 420. In yet another contemplated embodiment, the bag roller 410 features a space or opening to fit a finger or fingers to rotate the bag roller 410.

Alternatively, the top rim bag attachment mechanism can also be simple mechanical means such as hooks, pegs, or clips, to grasp and fasten the top rim of bag 500 to a frame assembly 400.

Figure 3A:
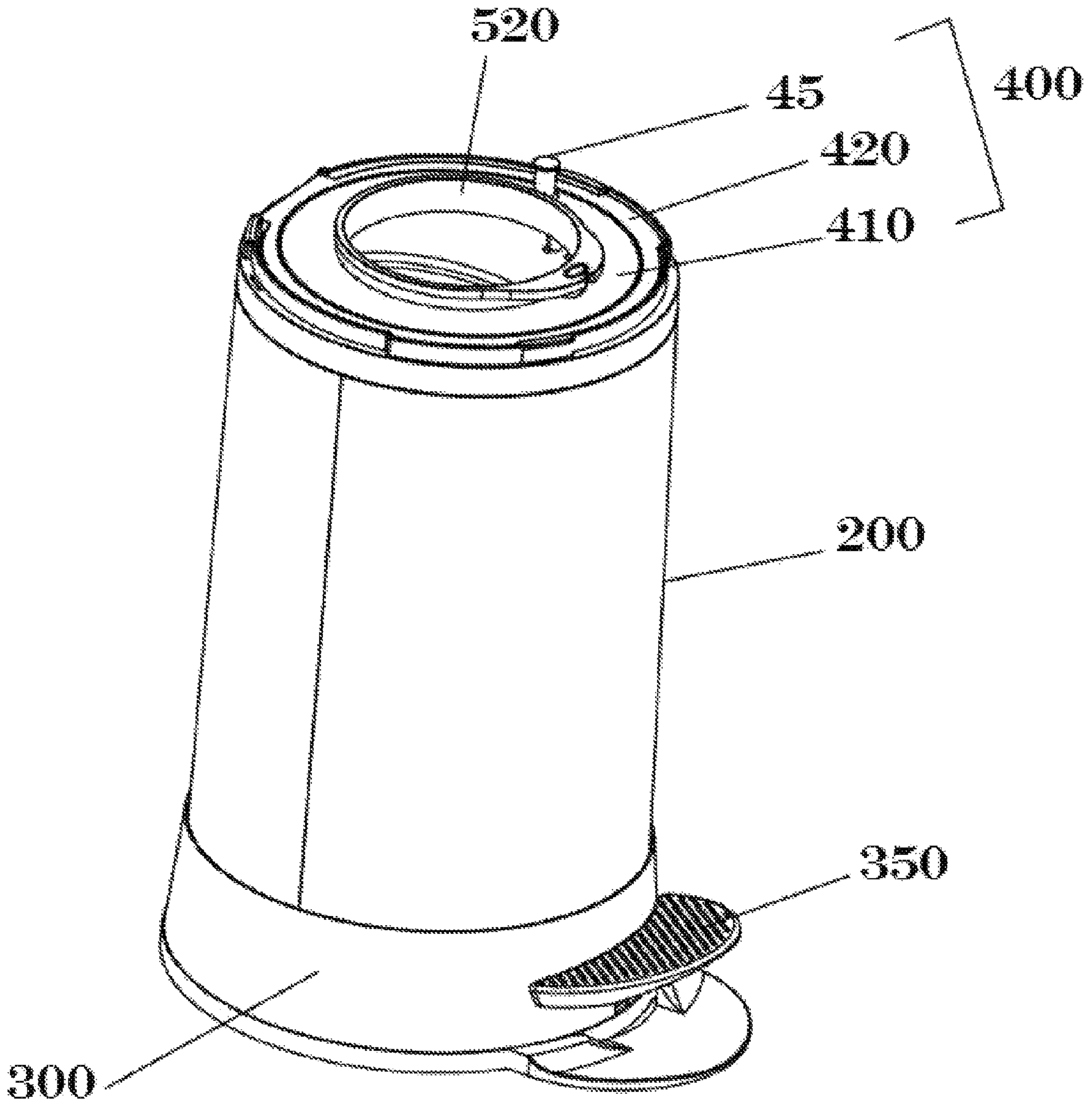
FIGS. 3A and 3B are top angled perspective views of the diaper pail of FIG. 1A with the top removed, where the bag assembly has a collar of FIG. 12B mounted on the frame assembly (the bag body portion is not shown for easier illustration).
Figure 3B:
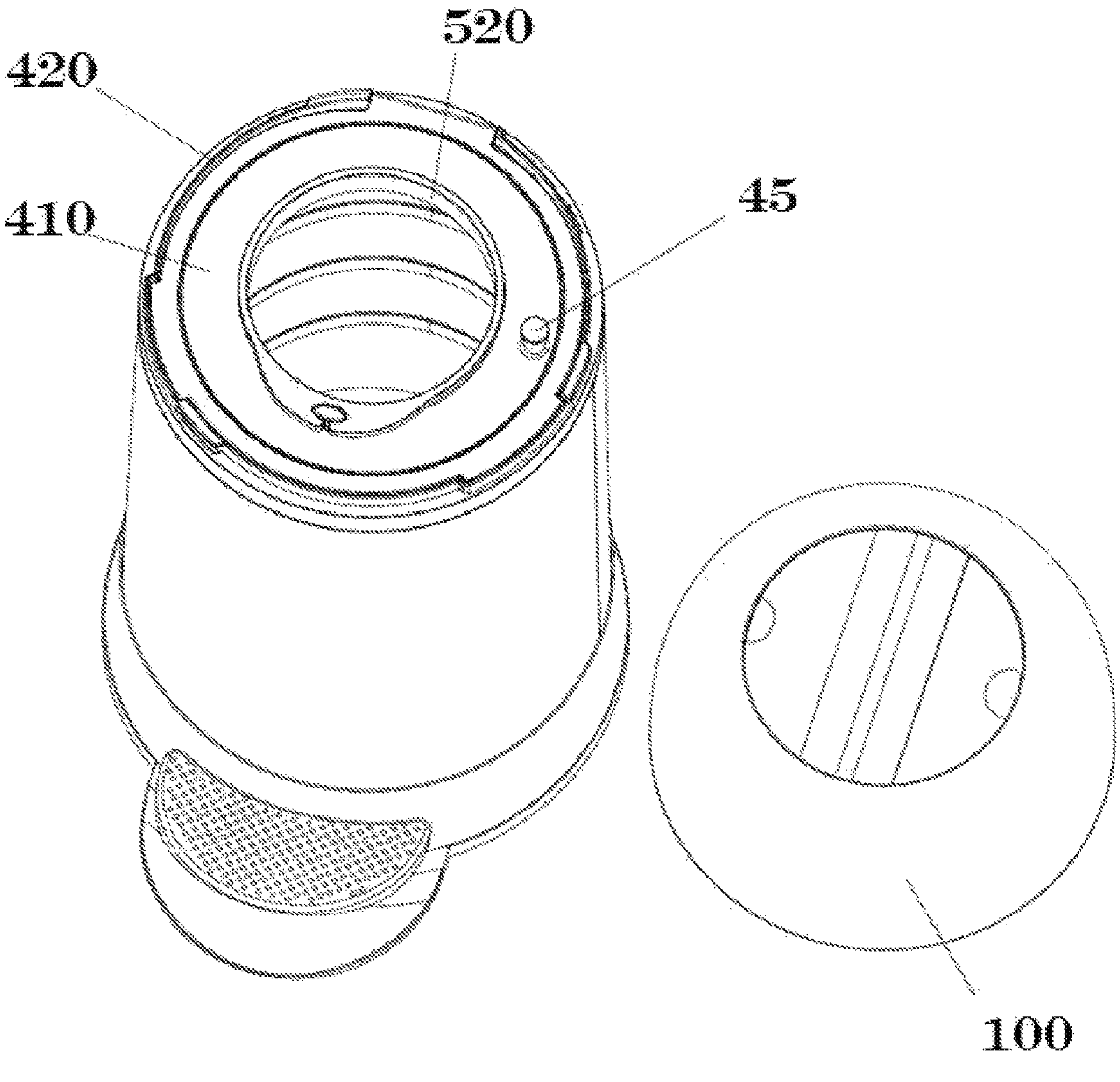

FIGS. 3A and 3B depict a diaper pail 10 with its top 100 removed for better illustration. From the depicted view, a contemplated embodiment of the frame assembly 400 is shown. In the depicted embodiment, the frame assembly 400 is positioned above the inner barrel 210 and along the inner circumference of the upper end of the outer barrel casing 200. In FIGS. 3A and 3B, a user had already reached through the center opening of the frame assembly 400, and pulled out the top rim 520 of the bag 500. Here, the top rim 520 of the bag 500 happens to be a preformed collar 520 similar to FIGS. 12A and 12B. And for easier illustration, the bag assembly 500 in FIGS. 3A and 3B are not fully shown, only its collar 520 is shown. Or, alternatively, in FIG. 3B, the bag assembly 500 is shown having a collar 520 and a transparent bag body portion. Because the bag body portion is transparent, one may see through it and see the internal wall of the inner barrel 210. An overview of the various embodiments of the bag assembly 500 can be seen in FIGS. 10-15B. The user next removably mounts collar 520 along the inner circumference of the frame assembly 400, more specifically it is mounted on the bag roller 410. In contemplated embodiments, the ring or collar 520 is preformed with or coupled to the open end (top rim) of a disposable bag 500 (as shown in FIGS. 10, 11, 12A, 13A, 14A, and 15A). Now the bag 500 is fixed in position, where its top rim is removably mounted onto the frame assembly, and its body is detachably coupled to an attachment site of the inner barrel 210. Rotation of the inner barrel 210 now effectively twists the neck of the bag 500.

Figure 3C:
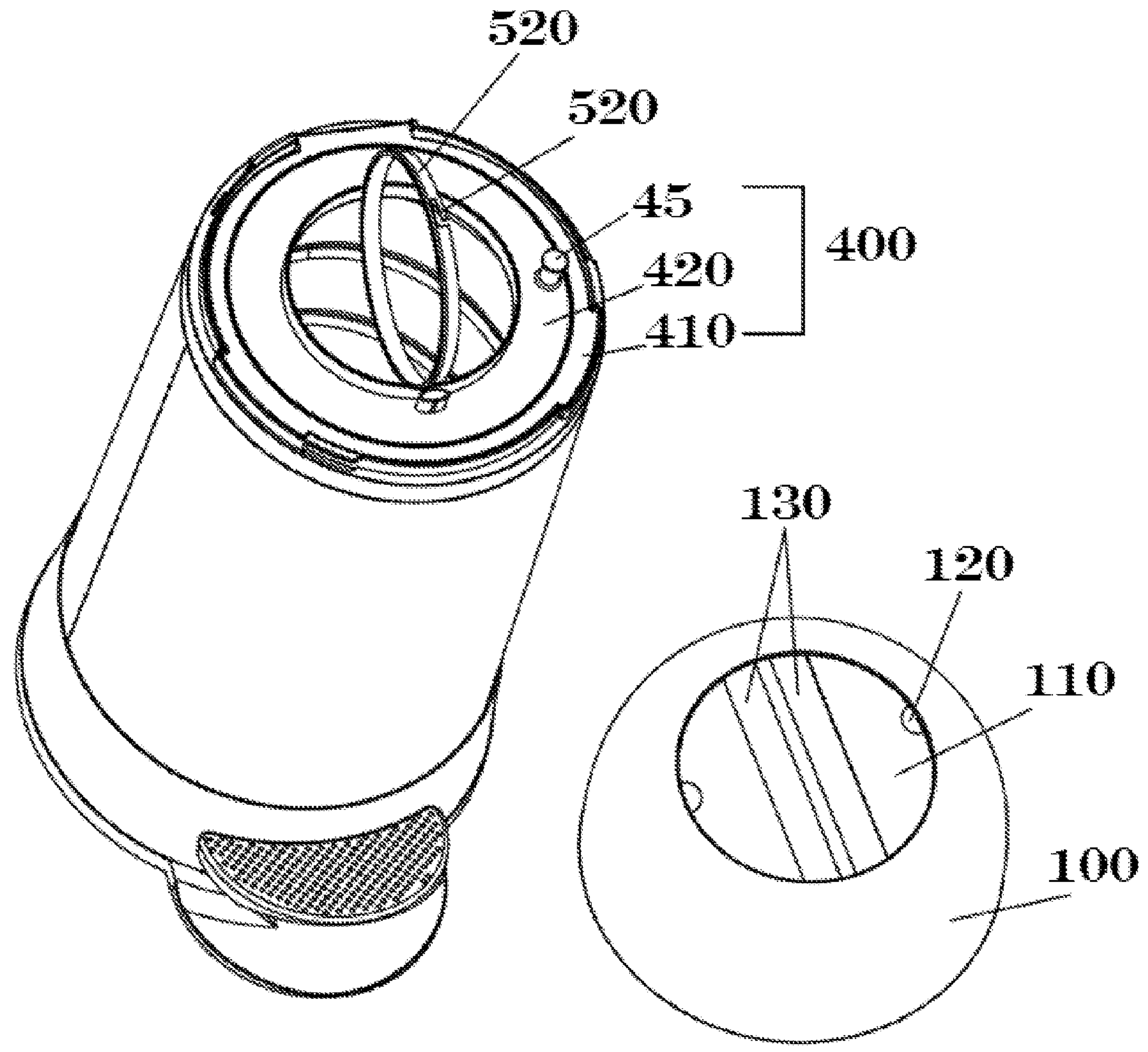
FIG. 3C is a top angled perspective view of the diaper pail of FIG. 1A, with the top removed, where the bag assembly has a collar of FIG. 14B not yet mounted on the frame assembly (the bag portion is not shown for easier illustration).

FIG. 3C is a perspective view of the diaper pail top 100 and the rest of the diaper pail 10 of FIG. 1A with a disposable bag collar 520 halfway pulled through the center hole of the frame assembly 400. In FIG. 3C, for better illustration purposes the rest of the bag 500 is not shown, and only the collar 520 of the bag is shown. In operation the bag 500 is always attached to the collar 520. In the preferred embodiments, the bag collar 520 is welded or somehow permanently coupled to a disposable plastic bag 500 by the manufacturer. Here in FIG. 3C, the collar 520 is sufficiently flexible so a user may squeeze it or deform it into an oval shape so the collar 520 can insert through the inner circumference of the frame assembly 400.

In another embodiment, the collar 520 can be individually provided without a permanently attached bag 500. In such embodiment, which looks like that shown in FIG. 3C, the collar 520 alone snaps in the rim of the center hole of the frame assembly, thereby acting as a first bag attachment. Basically, one would pull the open mouth of a conventional garbage bag from under the frame assembly 400 and through the center hole of the frame assembly 400. The user would then spread the mouth of the conventional garbage bag over the frame assembly. Next, the collar 520 by itself is snapped and wedged onto the inner rim of the center hole of the frame assembly, sandwiching the mouth of the conventional garbage bag in between.

Figure 4:
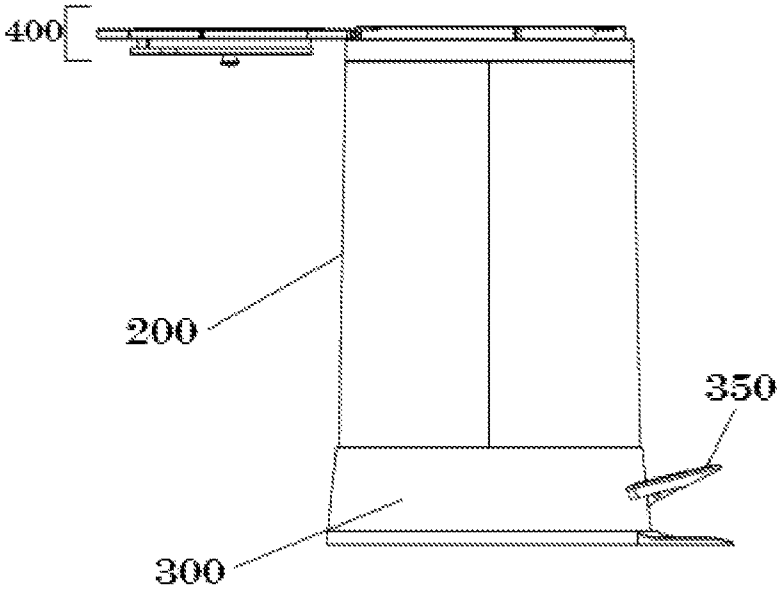
FIG. 4 is a side view of the diaper pail with the top removed and the frame assembly pivot open.
Figure 5:
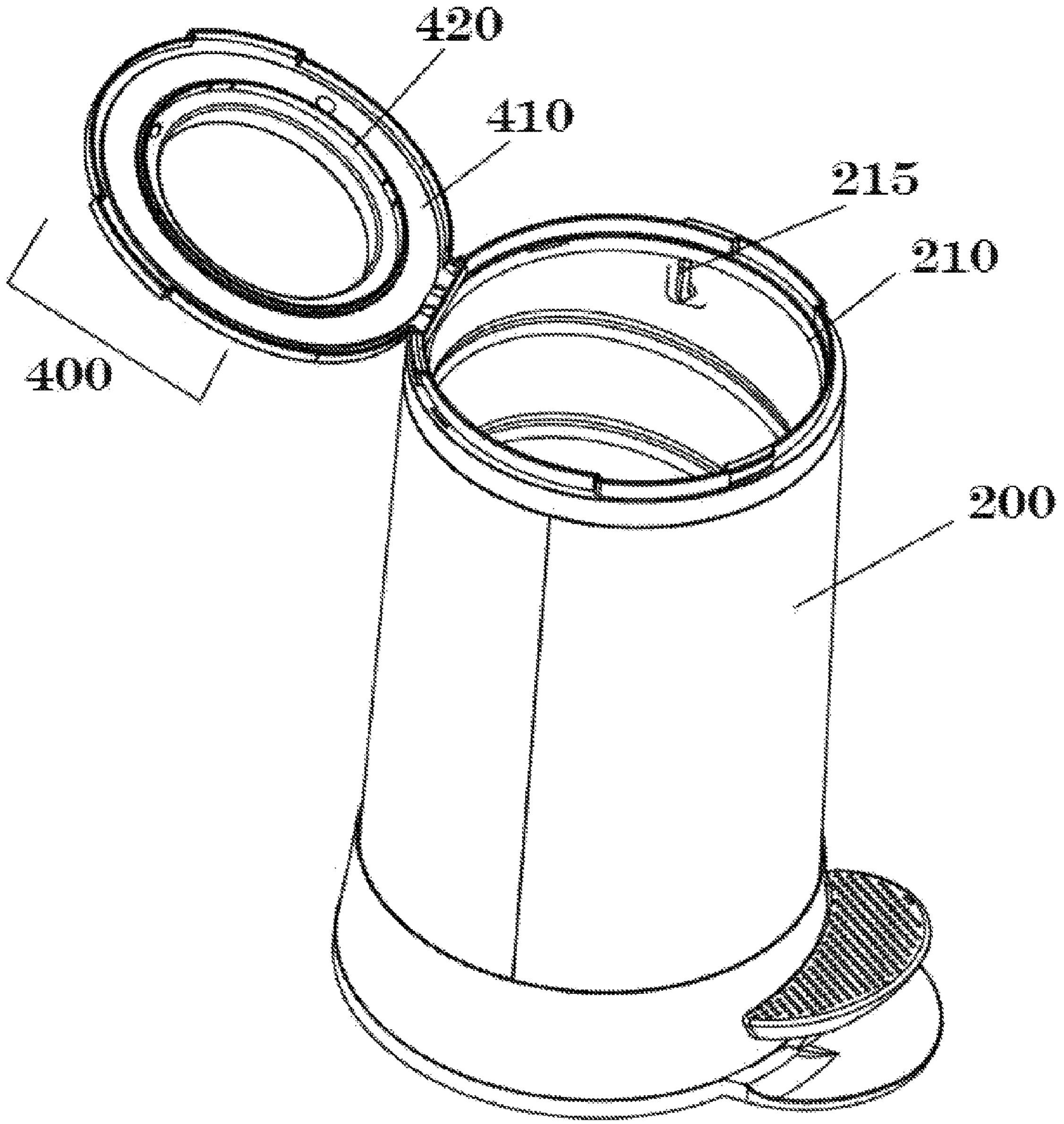
FIG. 5 is a top side perspective view of the diaper pail of FIG. 4.

FIGS. 4 and 5 show a preferred embodiment where the frame assembly 400 is pivotably coupled to the outer barrel casing 200. Here, the frame assembly 400 is pivoted open. FIG. 5 shows a close-up view of the frame assembly 400 coupled to the outer barrel casing 200 via a hinge. In this preferred embodiment, the frame assembly 400 is coupled to the outer barrel casing 200 via a hinge such that the frame assembly 400 can be flipped open when the disposable bag is full and should be removed or replaced. In less preferred embodiments, the frame assembly 400 is not pivotably attached to the outer barrel casing 200, and can be completely removed/detached from the diaper pail 10 in order to change a disposable bag 500.

Additionally, FIG. 5 further illustrates a close-up view of the bag attachment mechanism 215 located on the inside of inner barrel 210. In the depicted embodiment, the attachment mechanism 215 is a hook. Additionally, it should be appreciated that there are additional attachment mechanisms including a peg or a clip, and those contemplated herein may be derived in numerous manners.

FIG. 6A is a perspective view of the exterior of the top 100. FIG. 6B is a perspective view of the interior of the top 100 with the top 100 flipped upside down. Top 100 is detachably fastened to the outer barrel casing 200 by conventional methods such as being screwed on, or snapped into corresponding groves on the top rim of the outer barrel casing 200. In the pictured embodiment, the top has two pivoting transparent doors 110, each being semi-circular in shape. In general, preferred embodiments have at least one door panel 110 coupled to the top 100. Also shown is a close-up of the two seals 130, each of which is attached to the far ends of the two doors 110. When the two doors 110 close, their flexible seals 130 overlap each other, making an airtight seal. In the preferred embodiment, these seals 130 are also made of transparent material. Additionally, each of the doors 110 is biased shut via a resilient piece 120. The resilient piece 120 is coupled to the hinges and acts as a spring, yet resiliently allowing the doors to pivot open when a dirty diaper is dropped on the doors 110 based gravitational pull, thereby providing a touch-free means to dispose the dirty diaper. As mentioned previously, the resilient piece 120 includes and is not restricted to a spring coil, silicone or rubber piece. The resilient piece 120 must have sufficient spring tension such that after the door 110 opens, and the dirty diaper passes through, the door 110 will automatically swing back to its original position (shut).

Figure 7A:
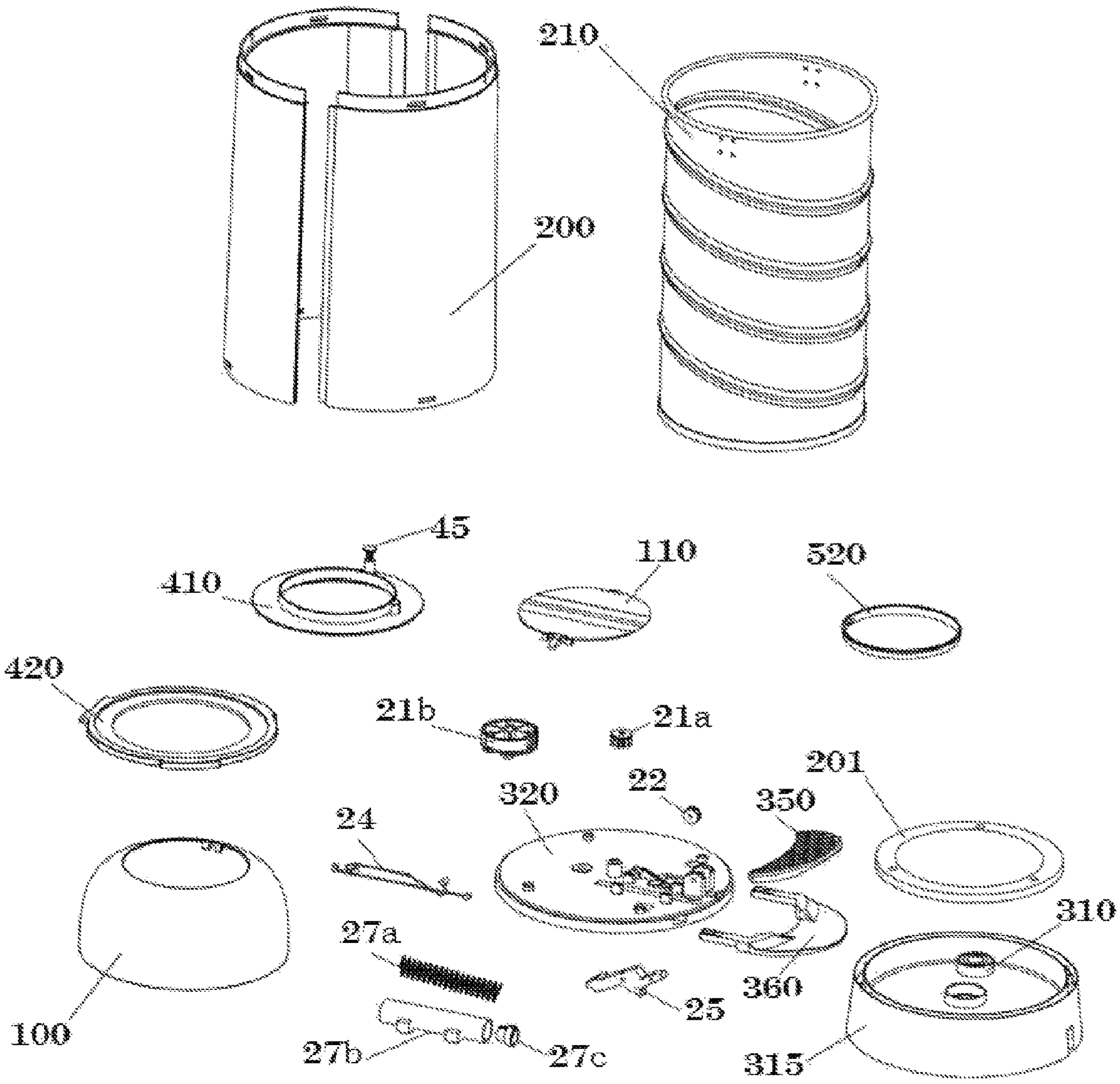
FIG. 7A is a perspective view of all the parts of the embodiment of FIG. 1A.
Figure 7B:
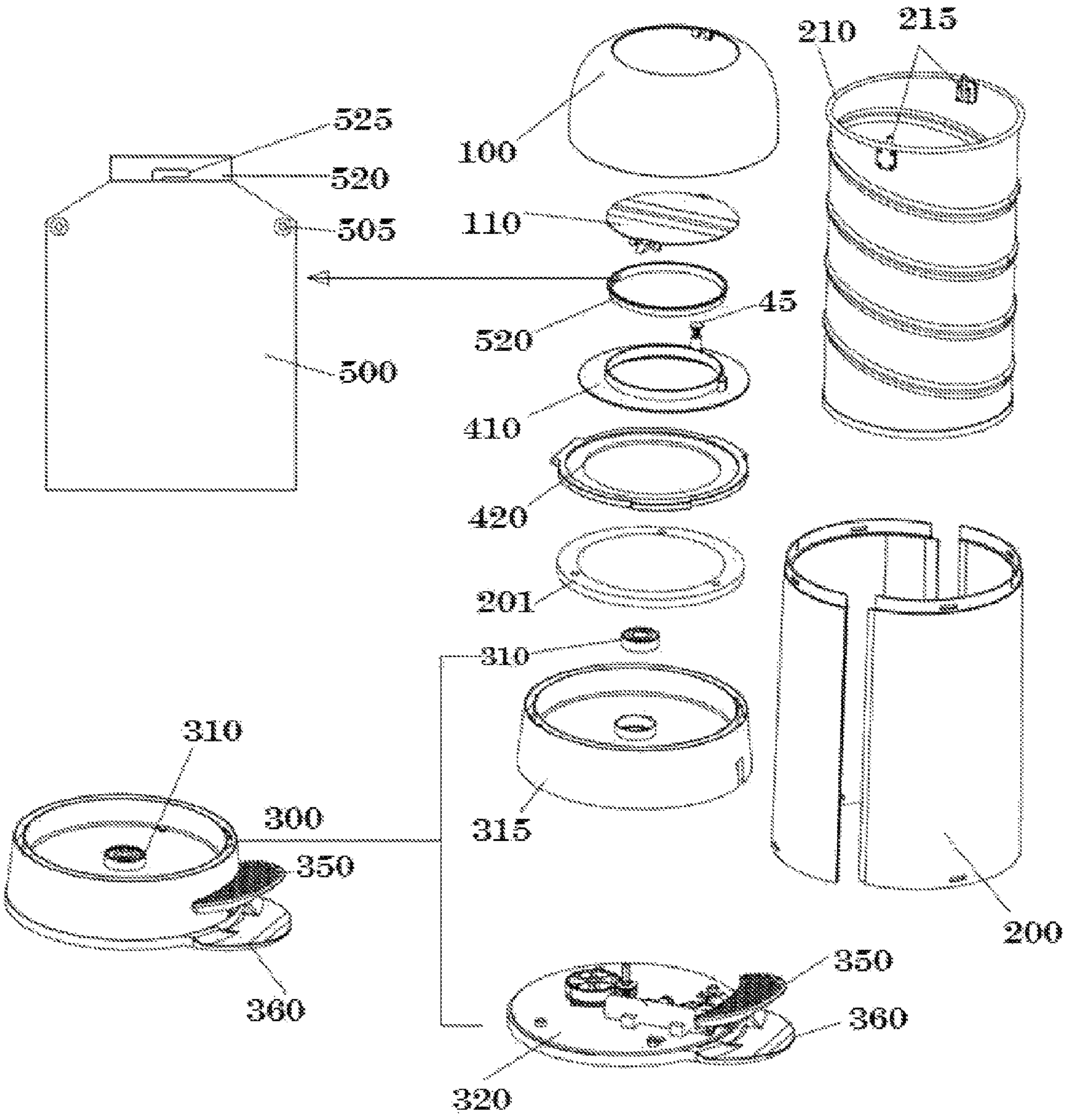
FIG. 7B is an exploded view of all the assembly parts of the embodiment of FIG. 1A.

FIG. 7A shows the assortment of the various parts in the diaper pail 10 of FIG. 1A. FIG. 7B is an exploded view of all the assembly parts of the embodiment of FIG. 1A. The exploded view in FIG. 7B features a top 100 and its top door 110. A bag collar 520 (which can or cannot be permanently attached to a bag 500, not shown) and frame assembly 400. The frame assembly 400 includes a peg 45 which fits into a slot in the bag roller 410, and the bag roller 410 rotates relative to the roller base 420. In the pictured embodiment, the inner barrel 210 fits onto an inner barrel base 201. The base 300 is comprised of a rotatable axle 309 (having a hexagonal cross-sectional shape), base cover 315, a base part 320, a bracing piece 360 and pedal 350. The inner barrel base 201 has a corresponding hexagonal female end to couple to the rotatable axle 309 such that the inner barrel 210 is driven by the rotation of the axle 309. In this embodiment, the outer barrel casing 200 is transparent and encases the circumference of the inner barrel 210.

Figure 8A:
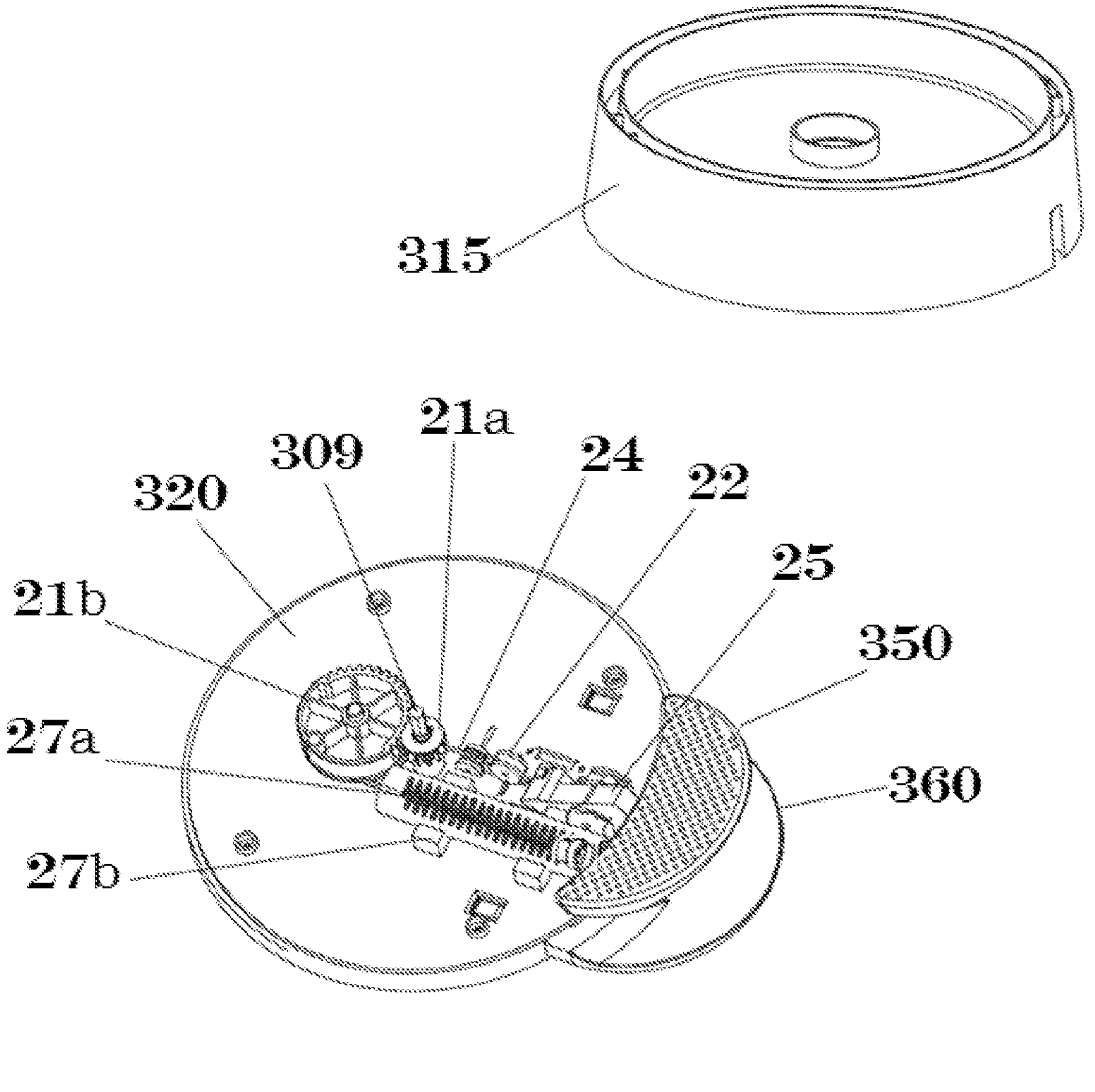
FIG. 8A is a perspective view of the inner parts of the base and pedal of the embodiment of FIG. 1A.
Figure 8B:
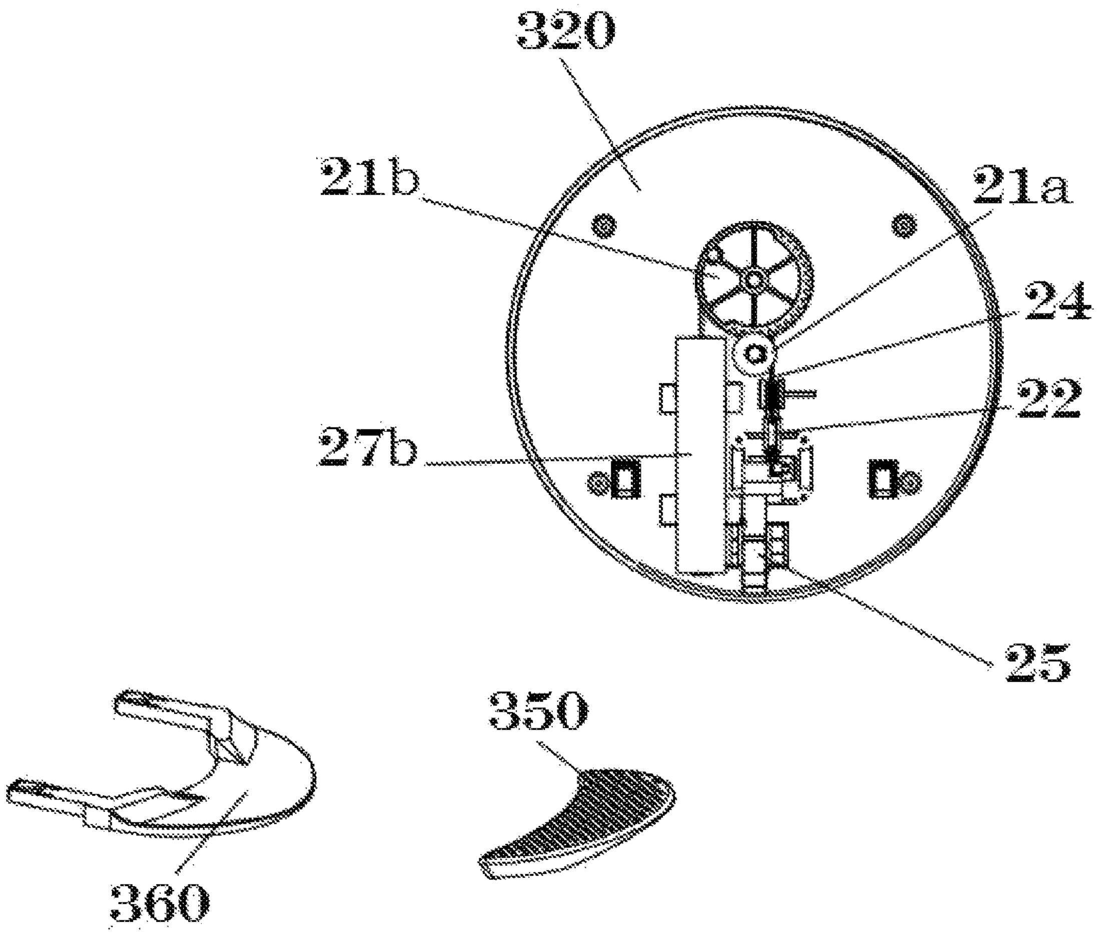
FIG. 8B is a top view of the base and perspective view of the pedal and bracing piece of the embodiment of FIG. 8A.
Figure 8C:
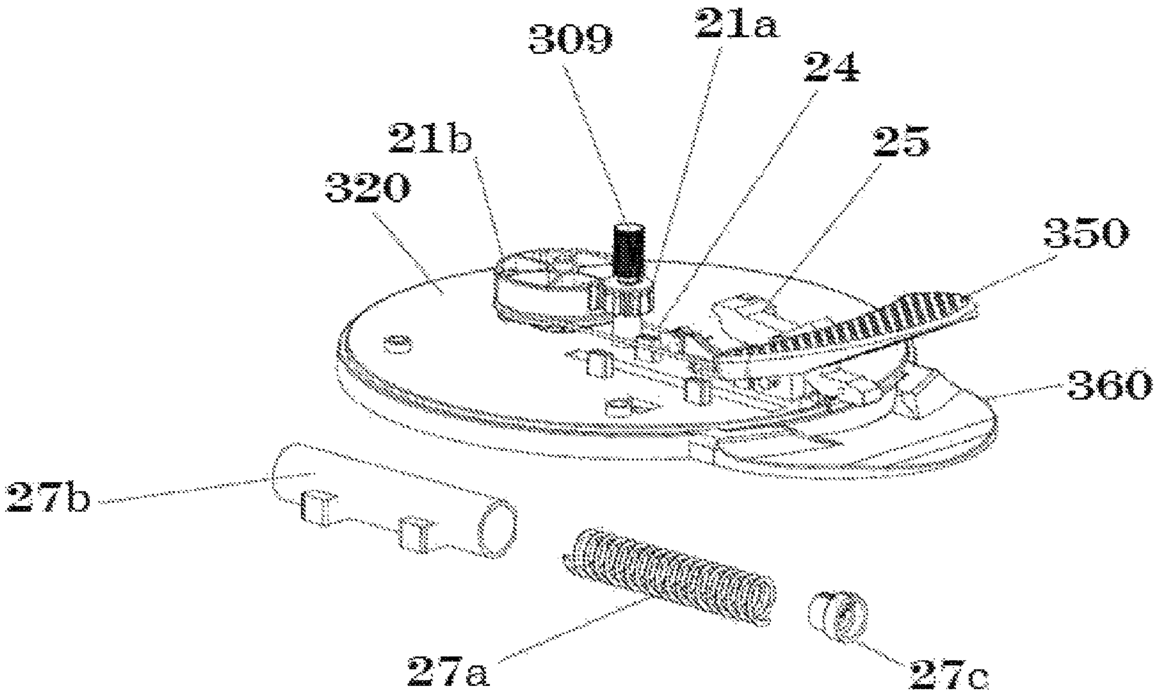
FIG. 8C is another view of the base and pedal of FIG. 8A, where the spring, spring plug, and the spring cover is taken apart.

FIGS. 8A-8B depict close-up views of the internal components in the base 300. In the embodiment shown in FIG. 8A, the base part 320 has the following parts: A spring plug 27*c* is coupled to a spring 27*a*, and a transparent spring cover 27*b* encases both the spring plug 27*c* and spring cover 27*b*. A large gear 21*b* is fixed on the base part 320 and coupled to a small gear 21*a*, which is also fixed on the base part 320. Turning of the large gear 21*b* would in turn rotate small gear 21*a*, which also turns the axle 309 which is attached and sits on top of the small gear 21*a*. Additionally there is a roller 22 which acts as a pulley. A metal wire 24 is attaches at one end near the base of the metal lever 25, and entrains about roller 22, and then about big gear 21*b*, and then enters into spring cover 27*b* and through the center of spring 27*a*, and until its terminal end reaches the spring plug 27*c*. This terminal end is attached to the spring plug 27C. The spring 27*a* is fixed at its end near gear 21B, and has a biasing force pushing the spring plug 27C in an outward direction. As the spring 27*a* pushes spring plug 27C outwardly, it pulls the metal wire taut. When a user steps on the foot pedal 350, it in turn pressed down on the outside leg of the lever 25, causing the inside leg of the lever 25 to go up. Because this leg of the lever is in abutting contact with the metal wire 24, upward movement of this inside leg of the lever 25 also pulls on the metal wire 25, against the roller 22 to which the metal wire 24 is partially leveraged against. As the metal wire 25 begins to pull against the force of the spring 27, the metal wire 25 moves, lengthwise, away from the spring 27*a*, thereby rotates the big gear 21*b*. Rotation of the big gear 21*b* in turn rotates small gear 21*a* and axle 309. Accordingly, the inner barrel 210 is coupled to the axle 309; thus, the inner barrel 210 is driven by the axle 309. FIG. 8B depicts a top view of the embodiment as described above. The parts depicted are part of one embodiment of the mechanics behind the rotational mechanism of the presently claimed invention. One of ordinary skill in the art would immediately recognize that there are other known rotational mechanisms capable of turning the inner barrel 210.

Figure 9A:
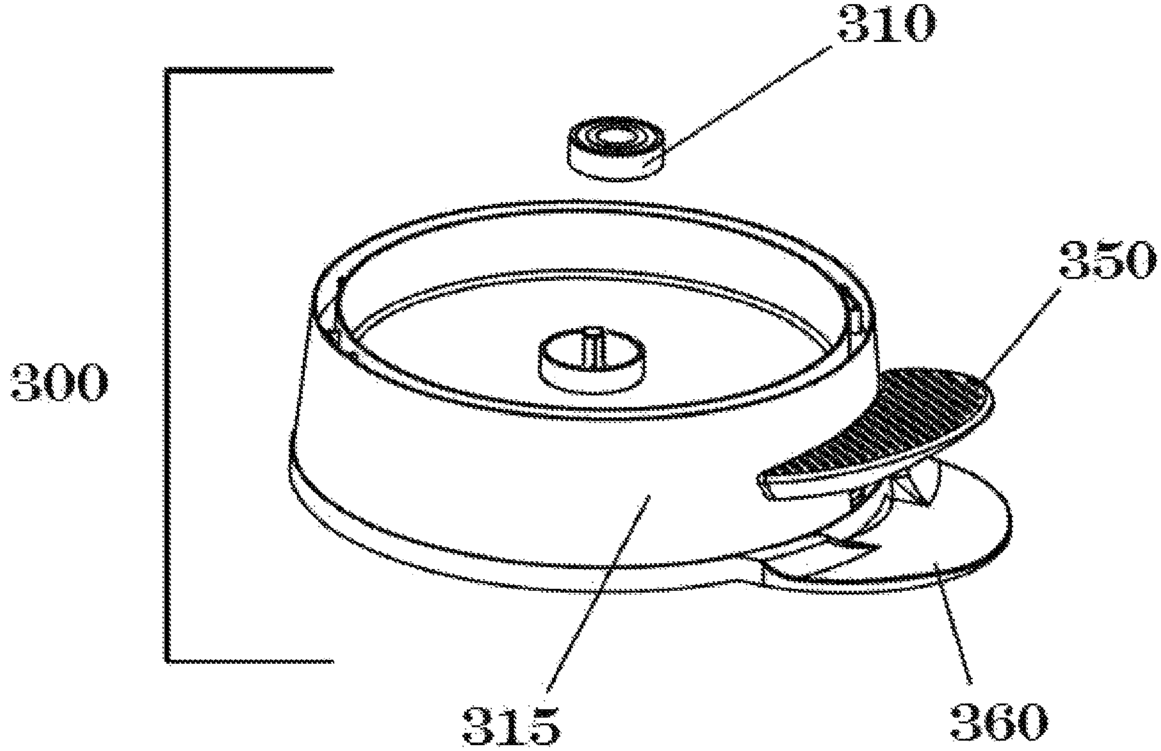
FIG. 9A is a perspective view of a first embodiment of an assembled base having a pedal, where the rotating axle extends through the center.

FIG. 9A is a perspective view of a first embodiment of an assembled base 300. In one embodiment, the main parts of the assembled base 300 as depicted include a base cover 315, base part 320, a pedal 350, and bracing piece 360. Protruding out of the center of the base cover 315 is axle 309. Fitted around the axle 309 is a ball bearing 310, to make rotation of the inner barrel 210 smoother. Along the upper rim of the base cover 315 is a groove with corresponding catches to receive the outer barrel 200. In the preferred embodiment, the outer barrel 200 fits into the groove and locks into place by rotating the outer barrel 200 clockwise.

The bracing piece 360 serves to provide sufficient leverage when compressing the pedal 350 so that the diaper pail 10 does not tip or tilt over. In less preferred embodiments, there is no bracing piece 360.

Figure 9B:
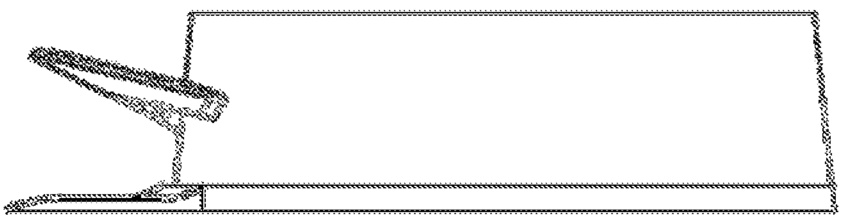
FIG. 9B is a side view of a first embodiment of an assembled base.
Figure 9C:
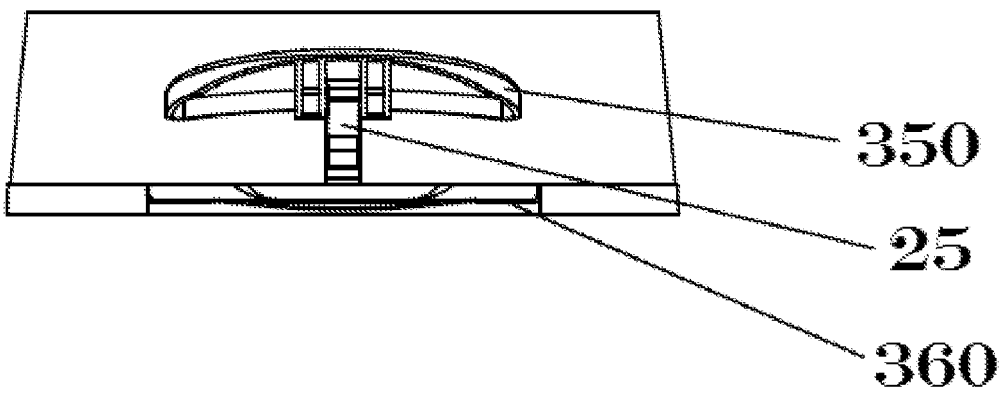
FIG. 9C is a front view of a first embodiment of an assembled base.
Figure 9D:
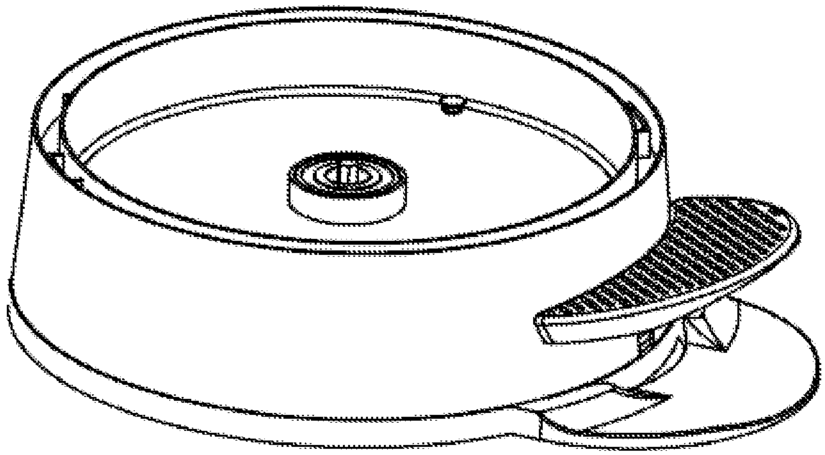
FIG. 9D is a perspective view of the base of FIG. 9A, where a ball bearing is fitted around the axle, yet still allowing the rotating axle to extend therethrough.

FIGS. 9B, 9C, and 9D are different views of the base 300 of FIG. 9A.

Figure 10:
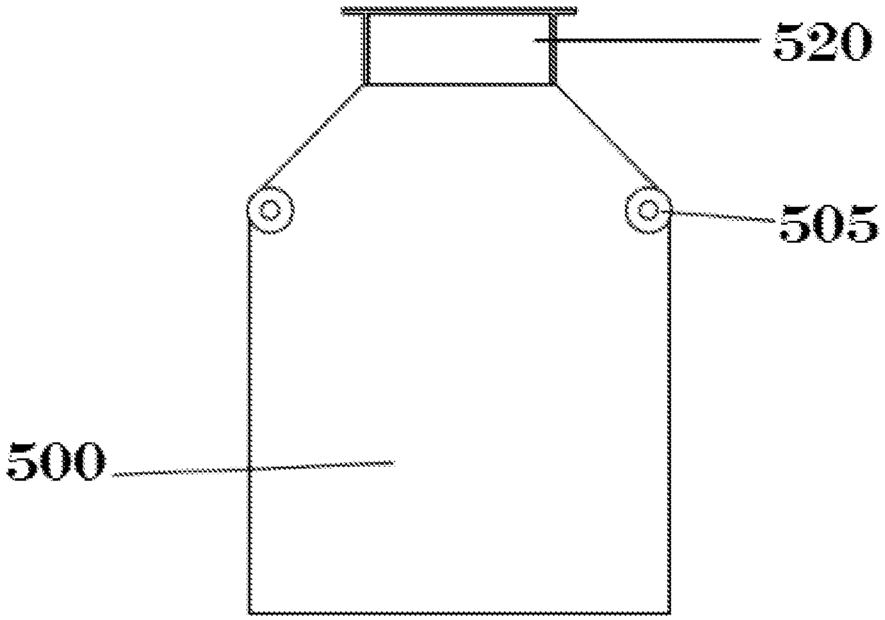
FIG. 10 is a first embodiment of a bag assembly with reinforced apertures.

Referring now to FIG. 10 is a disposable bag 500 having a ring/collar 520 permanently welded together with the bag 500. At the shoulder region are two welded/reinforced circular marks 505, the center of which is perforated, forming a through hole. The through holes are for attaching to corresponding bag attachment structures on the inner barrel 210.

Figure 11:
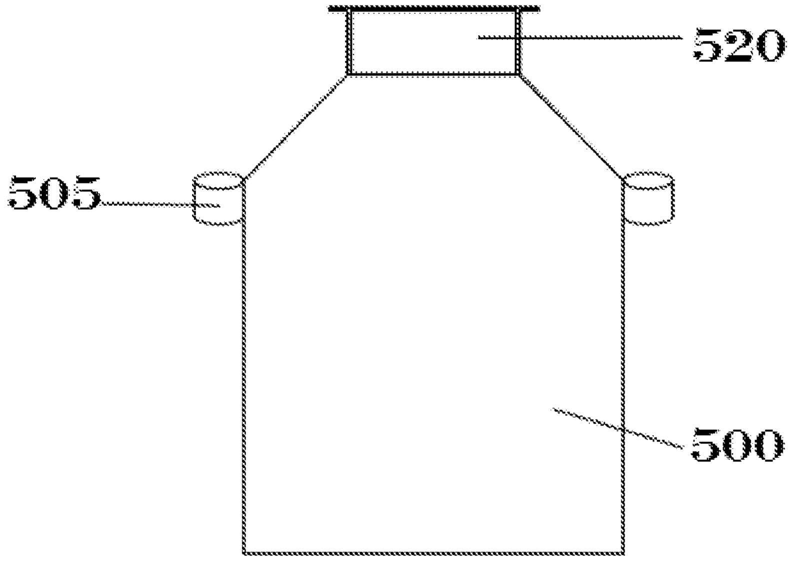
FIG. 11 is a second embodiment of a bag assembly with sleeves.

Similar to FIG. 10, FIG. 11 shows a disposable bag 500, the difference being it has two plastic sleeves 505 disposed on the shoulder region of the bag 500. The sleeves are for attaching the bag 500 to corresponding bag attachment structures on the inner barrel 210.

Figure 12A:
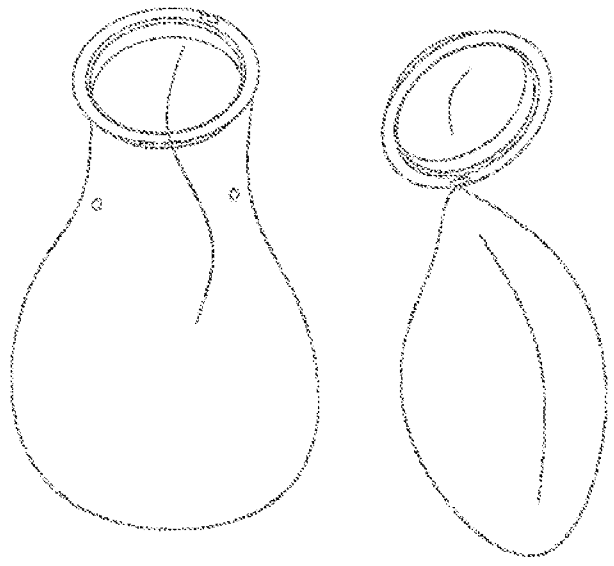
FIGS. 12A-12B is one embodiment of a bag assembly with one type of collar.
Figure 12B:
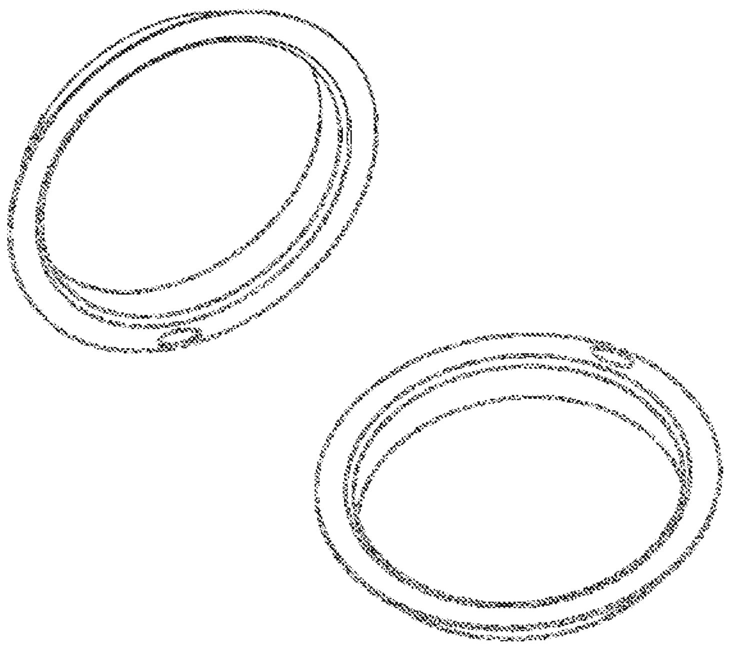

FIG. 12A shows a bag assembly 500 having a first type of collar 520, which is shown closer-up in FIG. 12B.

Figure 13A:
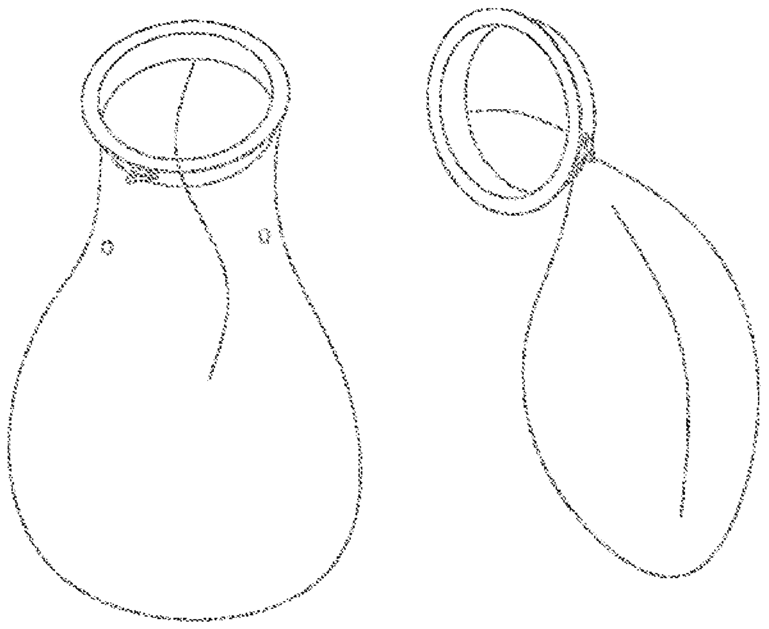
FIGS. 13A-13B is another embodiment of a bag assembly with another type of collar.
Figure 13B:
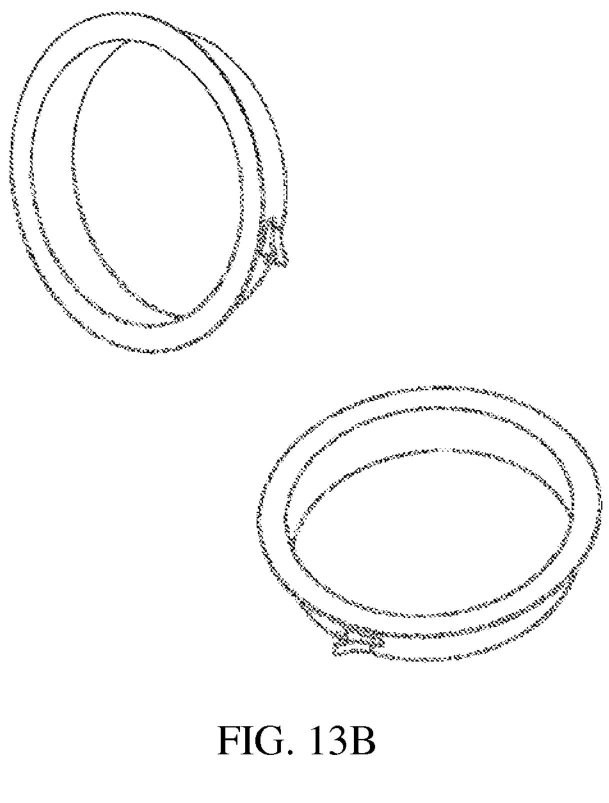

FIG. 13A shows a bag assembly 500 having a second type of collar 520, which is shown closer-up in FIG. 13B.

Figure 14A:
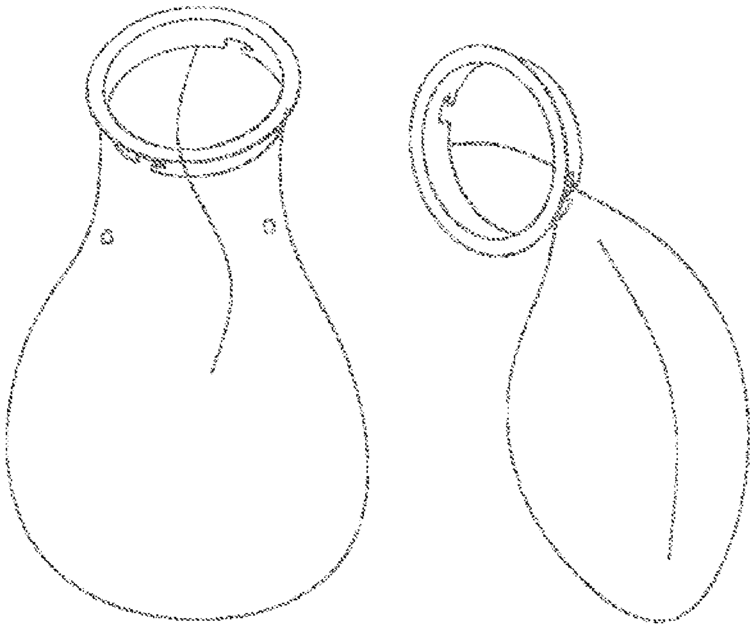
FIGS. 14A-14B is another embodiment of a bag assembly with another type of collar.
Figure 14B:
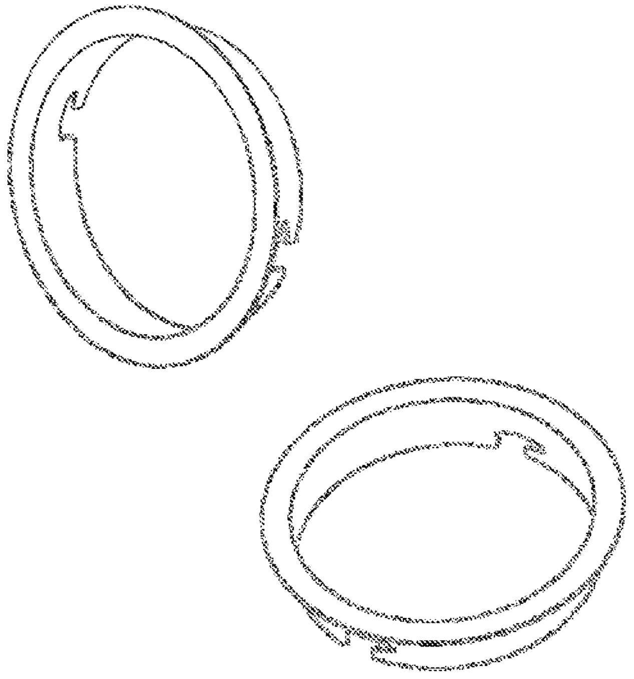

FIG. 14A shows a bag assembly 500 having a third type of collar 520, which is shown closer-up in FIG. 14B.

Figure 15A:
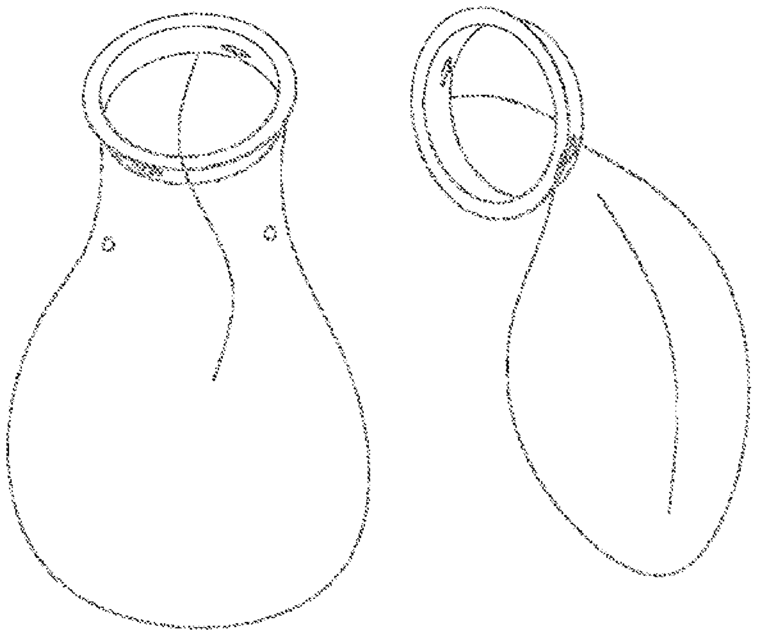
FIGS. 15A-15B is yet another embodiment of a bag assembly with yet another type of collar.
Figure 15B:
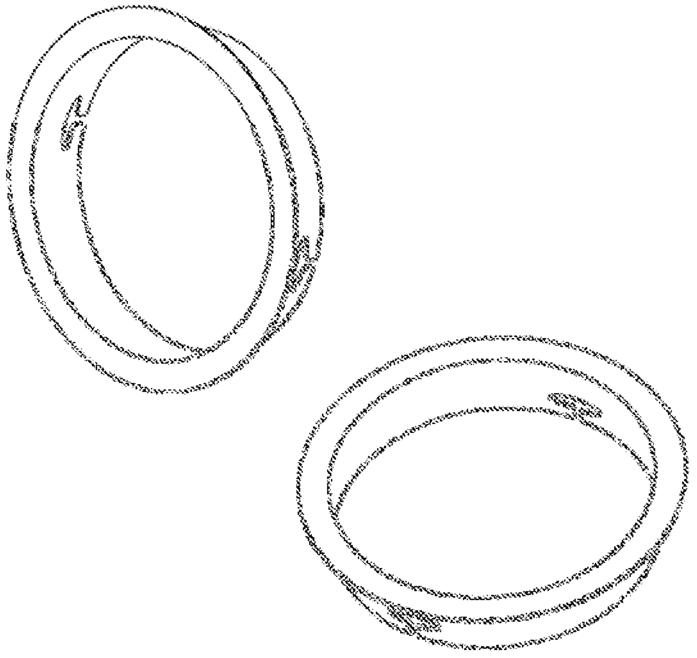

FIG. 15A shows a bag assembly 500 having a fourth type of collar 520, which is shown closer-up in FIG. 15B.

While the above description in general describes one preferred embodiment where the bag assembly is twisted closed by using a rotating inner barrel and twists the bag against the bag's top rim, which is fixed. One skilled in the art would immediately recognize a variety of ways to implement the inventive subject matter without twisting the neck of a bag.

Figure 16:
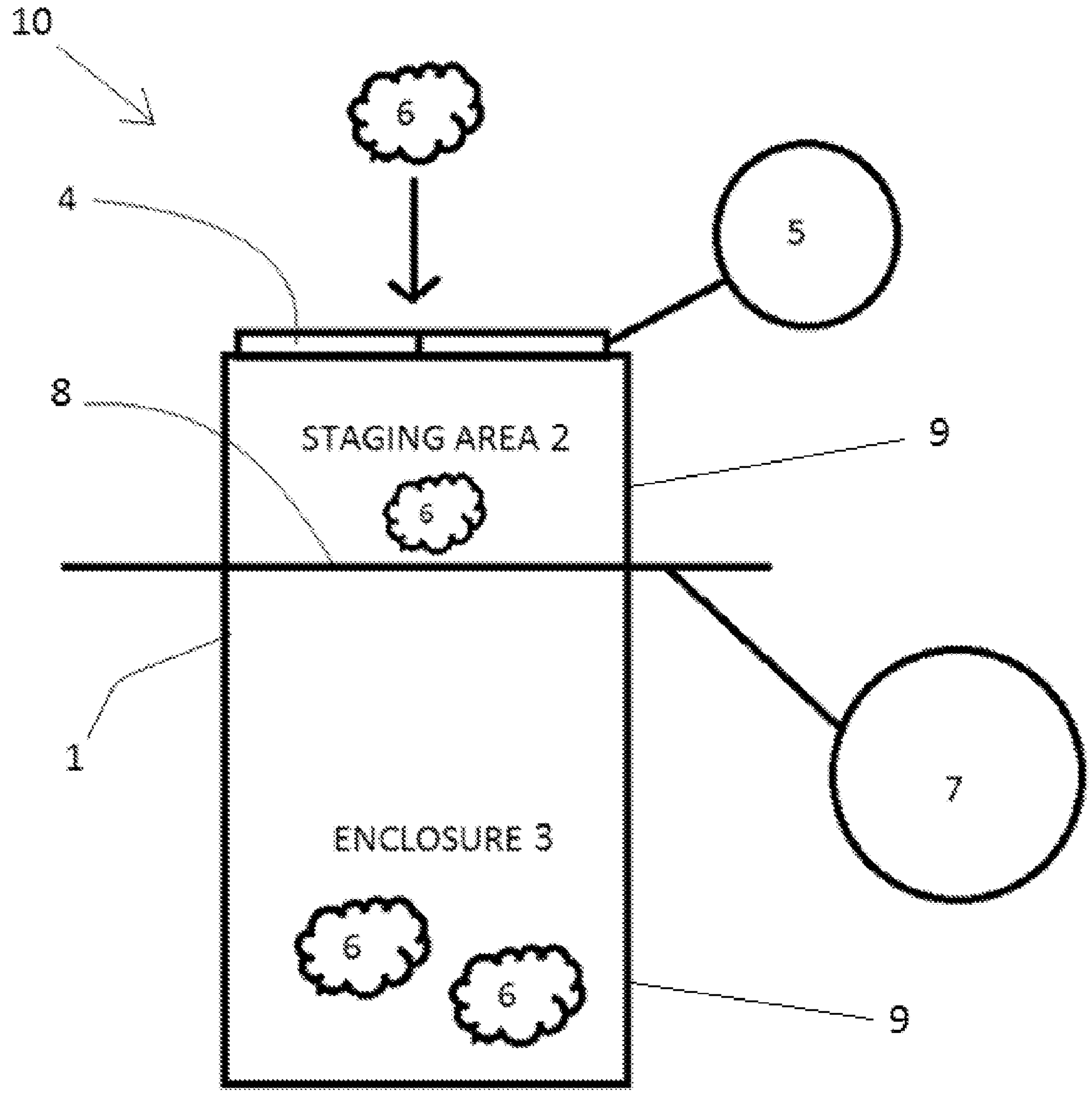
FIG. 16 is a schematic illustrating a more generalized embodiment of the inventive subject matter.

Referring now to FIG. 16, in a more generalized embodiment, a waste disposal system 10 has an enclosure 3 to hold waste material 6. The enclosure 3 is within a container assembly 1. The enclosure 3 can be simply an empty space inside of the container assembly 1. In one embodiment, the enclosure 3 is a disposable bag. In another embodiment, the enclosure 3 is a bucket that fits inside of the container assembly 1.

The container assembly 1 has a top door 4, an outer casing coupled to the top door 4, and an actuator 5 to control an opening and a closing of the top door 4. This actuator 5 can be any known mechanical, electrical, or magnetic types of controller. It can be as simple as a rubber spring as described above, or as complicated as a motorized unit along with a motion sensor to sense a user waving his/her hand to signal the motorized unit to open the top door 4.

The container assembly has a staging area 2 to temporarily hold a waste material for reasons already described. In one embodiment, the staging area is a clearance space between the top door and the entrance 2 to the enclosure. In another embodiment, this clearance space is at least 5 cm.

There is an entrance 8 to the enclosure 3, and the entrance 8 is independently controlled by actuator 7. An opening and closing of the entrance 8 is independent of the opening and closing of top door 4. Operation of actuator 7 can be by a foot pedal and a rotating inner barrel as already described to twist shut the neck (i.e., entrance 8) of the bag. In another embodiment, the actuator can involve a motorized unit that selectively opens and closes another set of doors (i.e., entrance 8) upon pressing of a button (or stepping on a button).

In yet another embodiment, a bag is used as an enclosure 3, and the bag does not twist within the container assembly. Instead, a neck of the bag is deformed by mechanical arms to essentially close its neck.

For reasons already described, this waste disposal system 1 can have a transparent top door is transparent.

For reasons already described, the waste disposal system 1 can have a transparent outer casing is transparent.

The embodiments as disclosed and described above also serve as an important tool in child development and infant behavior development. It is known that vision may be one of the least developed senses at birth, therefore visual input during the early months may have the most profound effect on baby's development nervous system. While an adult can distinguish many different shades of light and color, a newborn retina can only detect large contrasts between dark and light, or black and white. As the baby grows, the brain receives input from all five senses, causing nerve cells to multiply and form connection with other nerve cells. Study has found that if a baby is kept blindfolded the visual center in his brain would never develop. Some of the best ways to stimulate a baby's vision is using contrasting colors and stripes. As described above, in a preferred embodiment, the outer barrel casing 200 is transparent, allowing a user and the baby to see vibrant rotating colorful stripes disposed on the inner barrel 210. This powerful visual stimulant occurs together with a diaper changing event. Overtime, the visually enticing diaper pail not only stimulates a baby's visual center in his/her brain, it also changes infant behavior by associating diaper changing with such visually fascinating spectacle, acting as a positive reinforcement. Up until now, for infants and toddlers, diaper changing has always been associated with negative feelings.

In the case of toddlers, they are grown enough to be able to look down through the top transparent doors 110 of the diaper pail 10, and see the dirty diaper being swallowed up by the untwisting of the bag 500 (i.e., a fascinating event to watch). This is, too, acts as a positive reinforcement in infant and toddler behavior development.

While the inner barrel 210 is shown in the figures as having vertical stripes, also contemplated are visually enticing graphics on the exterior of the inner barrel 210, for example, contrasting colors of other geometric shapes, and cartoon characters.

Thus, specific embodiments and applications of system and apparatus for waste disposal and changing infant-toddler behavior have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A waste disposal system, comprising:
- a container assembly having:
  - a base;
  - an outer casing;
  - an inner barrel having an inner volume, and the inner barrel is disposed inside of the outer casing; and
  - a top chamber having at least one door disposed at a top of the top chamber;
  - a disposable bag detachably disposed within said inner barrel;
  - an actuator to control a rotational movement of the inner barrel;
- wherein when the actuator is at rest, a neck of the disposable bag is in a twisted-closed formation;
- wherein when the actuator is activated, the inner barrel rotates in a first direction untwisting the neck to an open formation;
- wherein when the actuator is deactivated, the inner barrel rotates in a second direction returning the neck to the twisted-closed formation;
- wherein a movement of the at least one door of the top chamber is independent of a movement of the inner barrel.

2. A waste disposal system of claim 1 further comprising a clearance height of at least 5 cm between an upper rim of the disposable bag and the at least one door of the top chamber, when the at least one door is closed.

3. A waste disposal system of claim 2, wherein the clearance height is at least 7 cm.

4. A waste disposal system of claim 2, wherein the at least one door of the top chamber is transparent or translucent.

5. A waste disposal system of claim 4, wherein the at least one door is biased closed, and opens in a downward direction.

6. A waste disposal system of claim 2, wherein the actuator comprises a foot pedal.

7. A waste disposal system of claim 2, further comprising:
- a first bag attachment mechanism coupled to the outer barrel to detachably attach to a top rim of the disposable bag, keeping the top rim stationary when a body portion of the disposable bag rotates along with the inner barrel; and
- a second bag attachment mechanism to detachably attach the body portion of the disposable bag to the inner barrel.

8. A waste disposal system of claim 7, wherein the first bag attachment mechanism is a frame assembly disposed above the inner barrel, wherein the frame assembly comprises a roller base and a bag roller; and wherein the bag roller is rotatable relative to the roller base.

9. A waste disposal system, comprising:
- an enclosure to hold waste material;
- a container assembly to contain said enclosure, the container assembly having:
  - a top door;
  - an outer casing coupled to the top door;
  - an actuator to control an opening and a closing to an entrance to the enclosure independent of the top door; and
  - a clearance space between the top door and the entrance to the enclosure.

10. A waste disposal system of claim 9, wherein the enclosure is a bag, and wherein the closing of the entrance is created by twisting a neck portion of the bag.

11. A waste disposal system of claim 9, wherein the top door is transparent or translucent.

12. A waste disposal system of claim 11, wherein the clearance space is at least 5 cm.

13. A waste disposal system of claim 12, wherein the enclosure is a bag, and the bag does not twist within the container assembly.

14. The waste disposal system of claim 12, wherein the outer casing is transparent or translucent.

15. A method of inspecting a fullness of a waste container while minimizing escape of odor from the waste container, the method comprising:
- providing a container assembly having a top transparent/translucent door and an outer casing;
- wherein the container assembly holds a disposable bag;
- providing an actuator for a user to selectively control opening and closing of the disposable bag independent of the top transparent/translucent door being open or shut, thereby allowing visual inspection down into the bag when the user selectively opens the bag while keeping the top transparent/translucent door closed.

16. The method of claim 15, further providing a clearance space of at least 5 cm between a top rim of the disposable bag and the top transparent/translucent door, while the door is shut.

17. The method of claim 15, wherein the actuator is controlled by a foot pedal.

18. A method of changing infant behavior by providing positive reinforcement in connection with diaper change, the method comprising:
- providing a diaper pail having a transparent outer casing and an inner barrel;
- wherein the inner barrel holds a disposable bag therein to contain dirty diaper, and the inner barrel is disposed within the transparent outer casing, and is rotatable relative to the outer casing;
- providing an actuator to rotate the inner barrel while opening the disposable bag to dispose the dirty diaper into said bag;
- providing visually enticing graphics on an exterior of the inner barrel, so as to provide visual stimulation to the infant whenever a dirty diaper is being disposed into the diaper pail.

19. The method of claim 18, wherein the enticing graphics is one selected from stripes, contrasting colors, and cartoon characters.

20. The method of claim 19, wherein the diaper pail has a top transparent door, allowing an infant to see a dirty diaper staying on top of a closed bag, prior to being dropped into the bag by selectively actuating the actuator, wherein the actuator is controlled by a foot pedal.

* * * * *